US012763388B2

(12) United States Patent
Lee et al.

(10) Patent No.: US 12,763,388 B2
(45) Date of Patent: Oct. 13, 2026

(54) BATTERY MODULE ASSEMBLY AND METHOD FOR MANUFACTURING BATTERY MODULE ASSEMBLY

(71) Applicant: HYUNDAI MOBIS Co., Ltd., Seoul (KR)

(72) Inventors: Geum Hyeon Lee, Yongin-si (KR); Ki Hyeon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 981 days.

(21) Appl. No.: 17/941,200

(22) Filed: Sep. 9, 2022

(65) Prior Publication Data

US 2023/0344025 A1 Oct. 26, 2023

(30) Foreign Application Priority Data

Apr. 22, 2022 (KR) ........................ 10-2022-0050258

(51) Int. Cl.
*H01M 10/48* (2006.01)
*H01M 10/42* (2006.01)
*H01M 50/258* (2021.01)

(52) U.S. Cl.
CPC ....... *H01M 10/482* (2013.01); *H01M 10/425* (2013.01); *H01M 50/258* (2021.01)

(58) Field of Classification Search
None
See application file for complete search history.

(56) References Cited

U.S. PATENT DOCUMENTS

2018/0151921 A1* 5/2018 Yun ...................... H01M 50/211
2021/0028514 A1* 1/2021 Park ......................... G01K 1/14
2021/0135301 A1 5/2021 Choi et al.

FOREIGN PATENT DOCUMENTS

| | | | |
|---|---|---|---|
| CN | 102804447 | A | 11/2012 |
| CN | 112366426 | A | 2/2021 |
| EP | 2595238 | A2 | 5/2013 |
| EP | 3637503 | A1 | 4/2020 |
| EP | 4 266 452 | B1 | 9/2022 |

(Continued)

OTHER PUBLICATIONS

Extended European Search Report issued Aug. 16, 2023 issued for the corresponding European Patent Application No. 22195913.3.

(Continued)

*Primary Examiner* — Basia A Ridley
*Assistant Examiner* — Heng M. Chan
(74) *Attorney, Agent, or Firm* — MORGAN, LEWIS & BOCKIUS LLP

(57) ABSTRACT

Provided is a battery module assembly in which unit modules are stacked. Each of the unit modules includes: a plurality of battery cells; and a plurality of cartridge assemblies for respectively fixing the plurality of battery cells. The battery module assembly includes: a sensing assembly mounted to upper ends of the plurality of cartridge assemblies and assembled thereto; a front cover for covering front surfaces of the cartridge assemblies; and a connector coupled and fixed to the front cover. The connector includes: a connector body; and a first protrusion region that protrudes from the connector body. An upper sensing assembly connection hole is formed in an upper region of each of the cartridge assemblies.

16 Claims, 39 Drawing Sheets

(56) References Cited

FOREIGN PATENT DOCUMENTS

| | | | |
|---|---|---|---|
| JP | 2013-534360 | A | 9/2013 |
| JP | 2020-518988 | A | 6/2020 |
| KR | 10-2012-0074415 | A | 7/2012 |
| KR | 10-2019-0118570 | A | 10/2019 |
| KR | 10-2019-0124022 | A | 11/2019 |
| KR | 10-2021-0012544 | A | 2/2021 |
| KR | 10-2021-0056074 | A | 5/2021 |
| KR | 10-2021-0122509 | A | 10/2021 |
| WO | 2021/201409 | A1 | 10/2021 |

OTHER PUBLICATIONS

Office Action dated Nov. 11, 2024, issued in corresponding Korean Patent Application No. 10-2022-0050258.
Office Action issued in corresponding Japanese Patent Application No. 2022-139457 dated Apr. 21, 2026, with English translation.
Office Action issued in corresponding Indonesian Patent Application No. P00202310416 dated Jul. 7, 2026.
Office Action issued corresponding Chinese Patent Application No. 202211208177.1 dated Aug. 10, 2026, with English translation.

* cited by examiner

BATTERY MODULE ASSEMBLY AND METHOD FOR MANUFACTURING BATTERY MODULE ASSEMBLY

CROSS-REFERENCE TO RELATED APPLICATION(S)

This application claims priority from and the benefit of Korean Patent Application No. 10-2022-0050258, filed on Apr. 22, 2022, which is hereby incorporated by reference for all purposes as if set forth herein.

TECHNICAL FIELD

Exemplary embodiments relate to a battery module assembly and a method for manufacturing the battery module assembly.

BACKGROUND

In battery modules according to the related art, high-strength exterior members for surrounding battery cells have to be manufactured newly due to increases in the thicknesses of the battery cells, and assembly fastening structures are vertically separated. In addition, an external input and output terminal is provided on the front of a stack, and a BMS (battery management system) connected to a sensing member to monitor and control the operation of a battery module is provided on the rear of a lower case, which makes it impossible to perform BMS A/S.

In addition, according to another related art, a pair of cell covers coupled to each other so as to surround the entire outer surface are configured such that battery cells are attached from both sides with a cartridge assembly therebetween. There is a limitation in that a battery module including a plurality of mounting parts of a support that have a linear structure protruding upward has to be perpendicular to the sensing structure.

RELATED ART DOCUMENT

Patent Documents

Korean Application Publication No. 10-2021-0056074

SUMMARY

Exemplary embodiments of the present invention provide a battery cell assembly having a cell tab shape and a cartridge assembly shape for enhancing insulating performance, the battery module assembly being configured such that the thickness of a cartridge is greater than the thickness of a battery cell. In the front region of the cartridge, cell tabs are bent in the same direction, and thus an insulating distance is secured. In the rear region of the cartridge, cell tabs are bent in directions to face each other, and thus an insulating distance is not secured. Accordingly, an adapter is provided between a plurality of cartridge assemblies.

A first exemplary embodiment of the present invention provides a battery module assembly in which unit modules are stacked, the batter module assembly comprises: each unit module includes a plurality of battery cells having electrode terminals and standing in a direction to come into surface contact with each other; and a plurality of cartridge assemblies configured to respectively fix the plurality of battery cells. In some embodiments, the battery module assembly includes: a sensing assembly mounted to upper ends of the plurality of cartridge assemblies and assembled thereto; a front cover configured to cover front surfaces of the plurality of cartridge assemblies; and a connector coupled and fixed to the sensing assembly. In some embodiments, the connector includes: a connector body; and a first protrusion region that protrudes from the connector body. In some embodiments, an upper sensing assembly connection hole is formed in an upper region of a cartridge assembly, wherein the first protrusion region has a shape insertable into the upper sensing assembly connection hole.

The first protrusion region may include: an extension section that extends from the connector body and protrudes outward; and a bent section that has a shape bent from the extension section, wherein the bent section has a shape insertable into the upper sensing assembly connection hole.

The connector may include a second protrusion region that is provided separately from the first protrusion region and protrudes from the connector body, and a direction, in which the extension section extends from the connector body, may be parallel to a direction, in which the second protrusion region extends from the connector body.

A length, by which the extension section extends from the connector body, may be greater than a length, by which the second protrusion region extends from the connector body.

The each of the cartridge assemblies may include a partition wall region that has a shape protruding upward and extending in a front-rear direction as a longitudinal direction, and the upper sensing assembly connection hole may be formed in the partition wall region.

A distance between the first protrusion region and the second protrusion region may correspond to a distance between two partition wall regions provided in two neighboring cartridge assemblies.

When the connector is assembled to the plurality of cartridge assemblies such that the bent section is inserted into an upper sensing assembly connection hole of one cartridge assembly of the two neighboring cartridge assemblies while the second protrusion region faces a partition wall region of another cartridge assembly of the two neighboring cartridge assemblies, a width of the second protrusion region extending in the longitudinal direction of the partition wall region of the each of the plurality of cartridge assemblies may be greater than a width of the first protrusion region extending in the longitudinal direction of the partition wall region of the each of the plurality of cartridge assemblies.

The sensing assembly may include a plurality of cartridge connection protrusions provided inside an upper end thereof, and the plurality of cartridge connection protrusions may be inserted into only a portion of a plurality of upper sensing assembly connection holes formed in the plurality of cartridge assemblies.

A second exemplary embodiment of the present invention provides a method for manufacturing a battery module assembly, the method including: a unit module preparation operation of preparing a unit module that includes a plurality of battery cells and a plurality of cartridge assemblies for fixing the plurality of battery cells; a sensing assembly mounting operation of mounting a sensing assembly to upper ends of the plurality of cartridge assemblies; a first connector fixing operation of temporarily fixing, to one side of the plurality of cartridge assemblies, a connector which is provided in the sensing assembly; a welding operation of welding the unit module and the sensing assembly to each other; a front cover placement operation of placing a front cover to the front of the unit module; and a second connector fixing operation of fixing the connector to the front cover.

The connector may include a connector body and a first protrusion region protruding from the connector body, and an upper sensing assembly connection hole may be formed in an upper region of each of the cartridge assemblies, wherein during the first connector fixing operation, the first protrusion region is inserted into the upper sensing assembly connection hole.

The first protrusion region may include an extension section, which extends from the connector body and protrudes outward, and a bent section, which has a shape bent from the extension section, wherein during the first connector fixing operation, the bent section is inserted into the upper sensing assembly connection hole.

The connector may include a second protrusion region that is provided separately from the first protrusion region and protrudes from the connector body, wherein during the first connector fixing operation, the second protrusion region comes into close contact with the cartridge assembly.

The cartridge assembly may include a partition wall region which has the upper sensing assembly connection hole formed therein and has a shape protruding upward and extending such that a front-rear direction is a longitudinal direction, wherein during the first connector fixing operation, the second protrusion region comes into close contact with a side surface of the partition wall region.

The sensing assembly may include a plurality of cartridge connection protrusions provided inside an upper end thereof, wherein during the sensing assembly mounting operation, the plurality of cartridge connection protrusions are inserted into only a portion of the plurality of upper sensing assembly connection holes formed in the plurality of cartridge assemblies, wherein during the first connector fixing operation, the bent section is inserted into another portion of the plurality of upper sensing assembly connection holes formed in the plurality of cartridge assemblies.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1A:
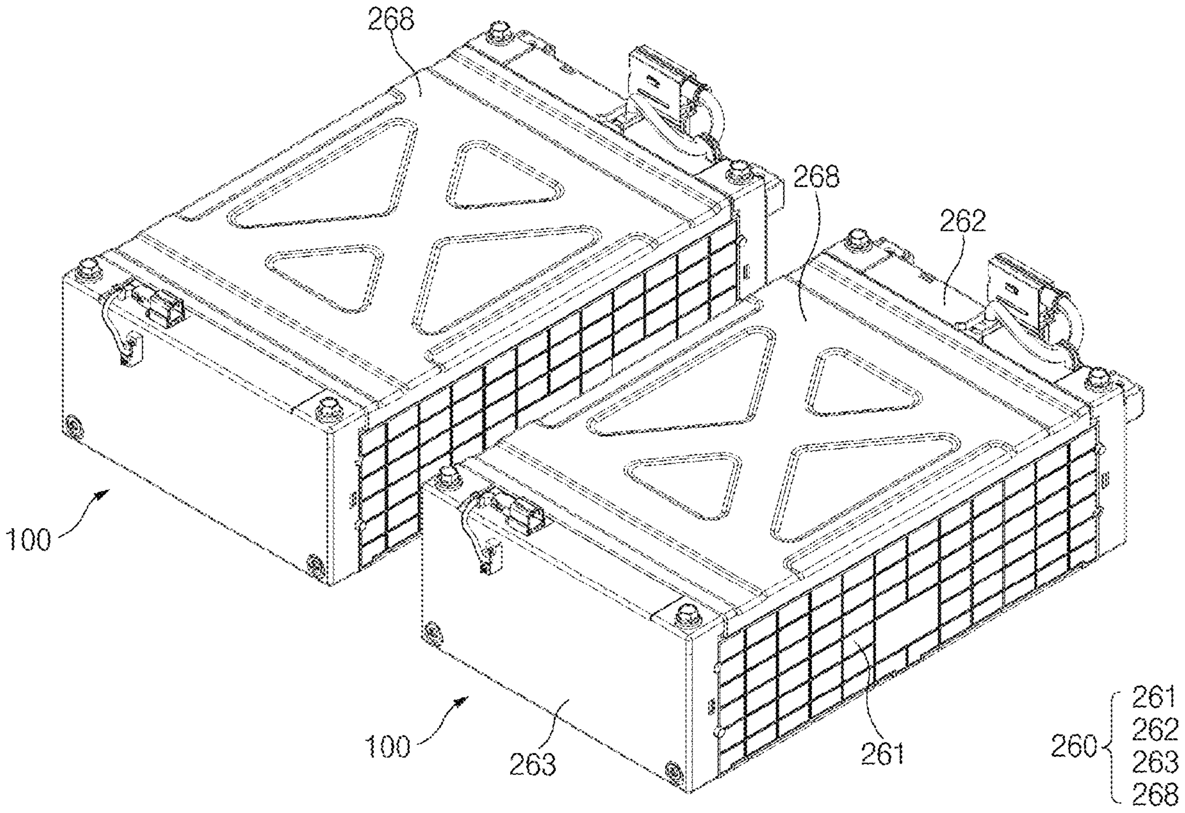
FIGS. 1A to 1B are reference views for describing a battery module assembly having a cell tab shape and a cartridge assembly shape for enhancing insulating performance according to an exemplary embodiment of the present disclosure.

Since the present disclosure may be diversely modified and have various exemplary embodiments, specific embodiments are illustrated in the drawings and described in detail in the detailed description. However, this is not intended to limit the present disclosure to the specific embodiments, and it should be understood that the present disclosure covers all the modifications, equivalents, and replacements within the idea and technical scope of the present disclosure. In the description of the present disclosure, if a detailed description related to well-known technology is determined to obscure subject matters of the present disclosure, the detailed description may be omitted.

The terms “first”, “second”, etc. may be used herein to describe various elements, but these elements should not be limited by these terms. These terms are only used to distinguish one element from another element.

Also, a term “ . . . part” used herein represents a unit that performs one or more functions or operations, and this may be embodied as hardware or software or embodied as a combination of hardware and software.

In the present application, the terms are used only to explain a specific embodiment and not intended to limit the present disclosure. The singular forms include the plural forms as well, unless the context clearly indicates otherwise. In the present application, it will be understood that the term “includes” or “comprises”, when used herein, specifies the presence of stated features, numbers, steps, operations, elements, components, or a combination thereof, but does not preclude the presence or addition of one or more other features, numbers, steps, operations, elements, components, or combinations thereof. Hereinafter, exemplary embodiments of the present disclosure will be described in detail with reference to the accompanying drawings.

First Embodiment

Figure 1B:
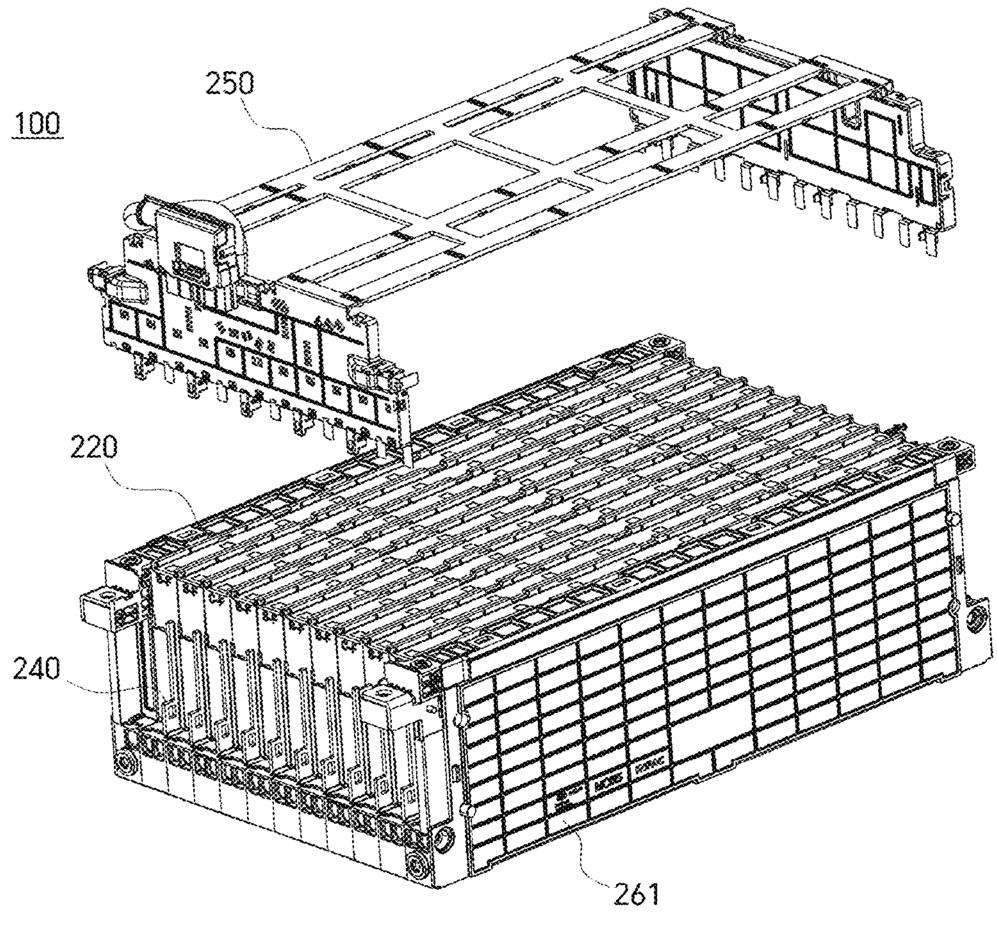
Figure 2A:
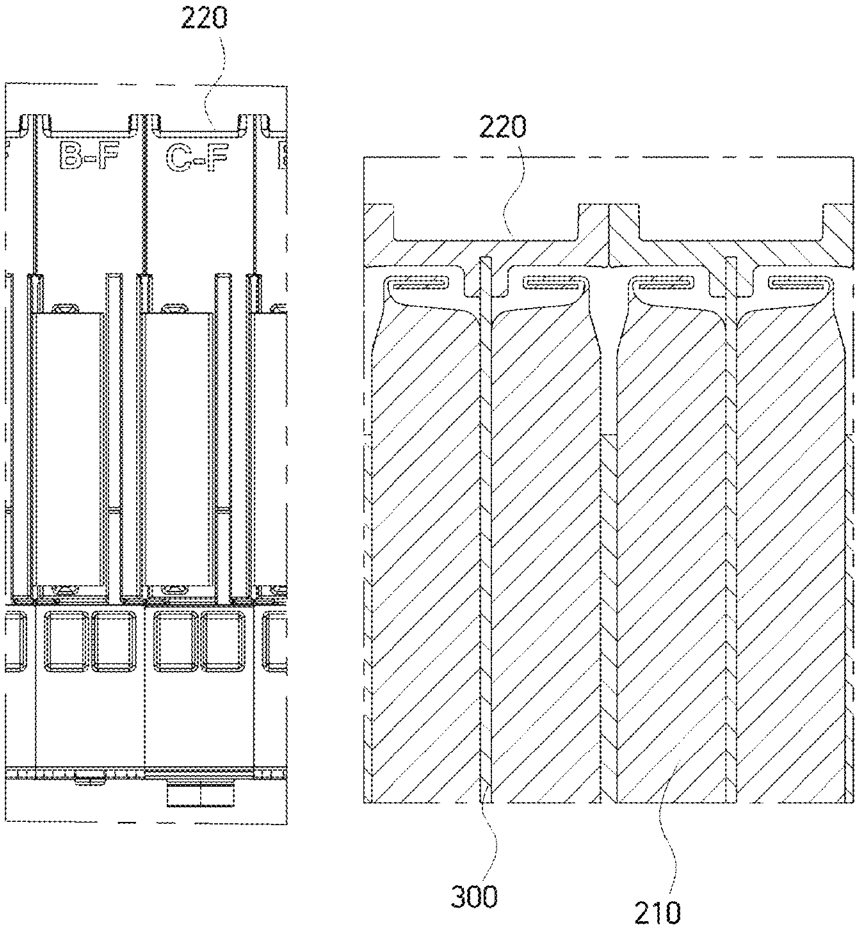
FIGS. 2A to 2B are reference views for describing coupling between a cartridge assembly, a battery cell, and a sensing assembly according to an exemplary embodiment of the present disclosure.
Figure 2B:
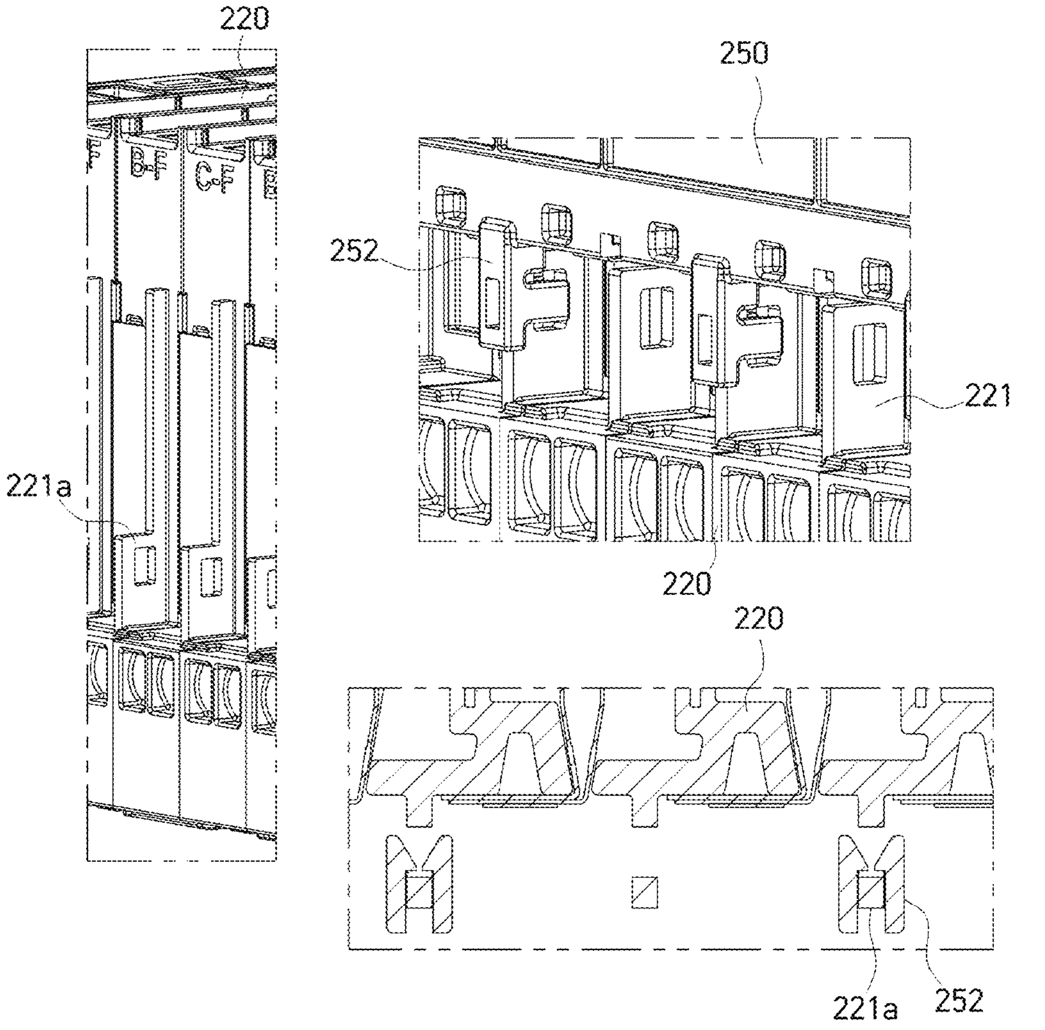
Figure 3A:
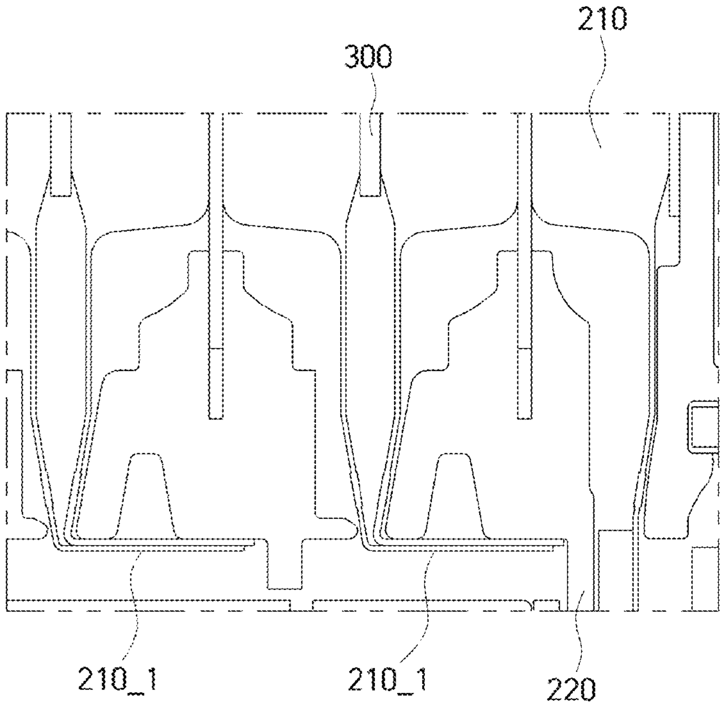
FIGS. 3A to 3B are reference views for describing cell tab bending according to an exemplary embodiment of the present disclosure.
Figure 3B:
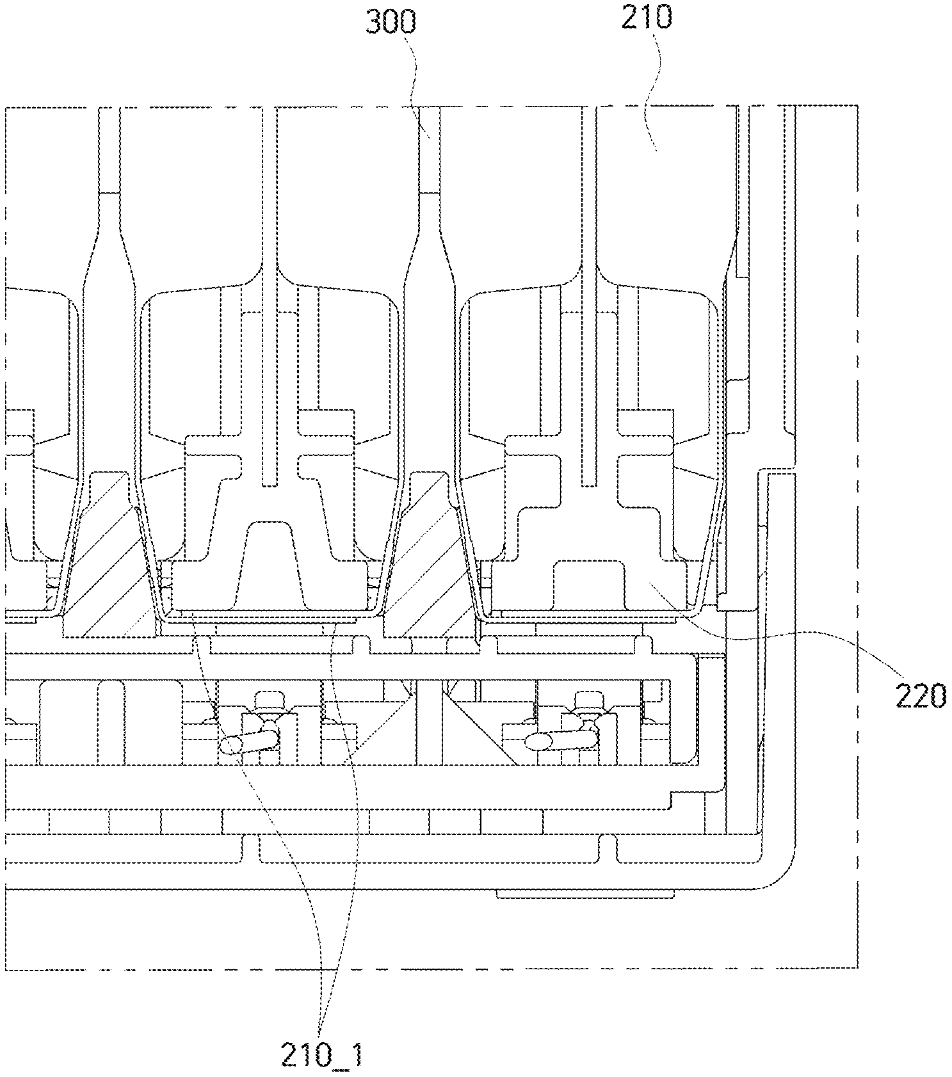
Figure 4:
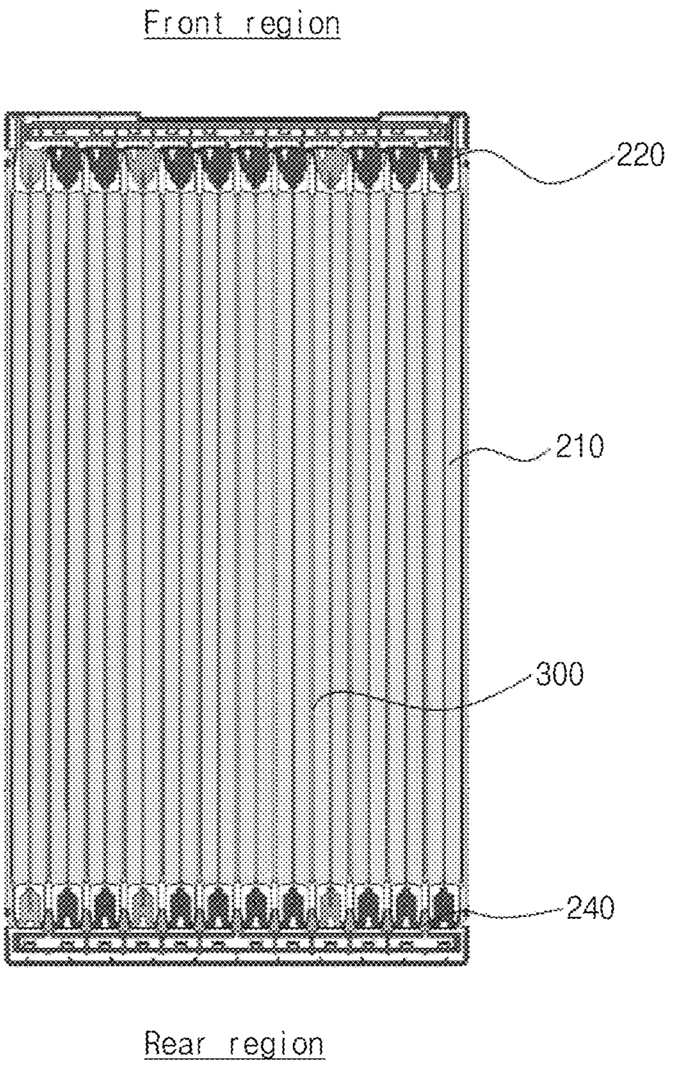
FIG. 4 is a reference view for describing coupling between a cartridge assembly, a battery cell, and an adapter according to an exemplary embodiment of the present disclosure.
Figure 5:
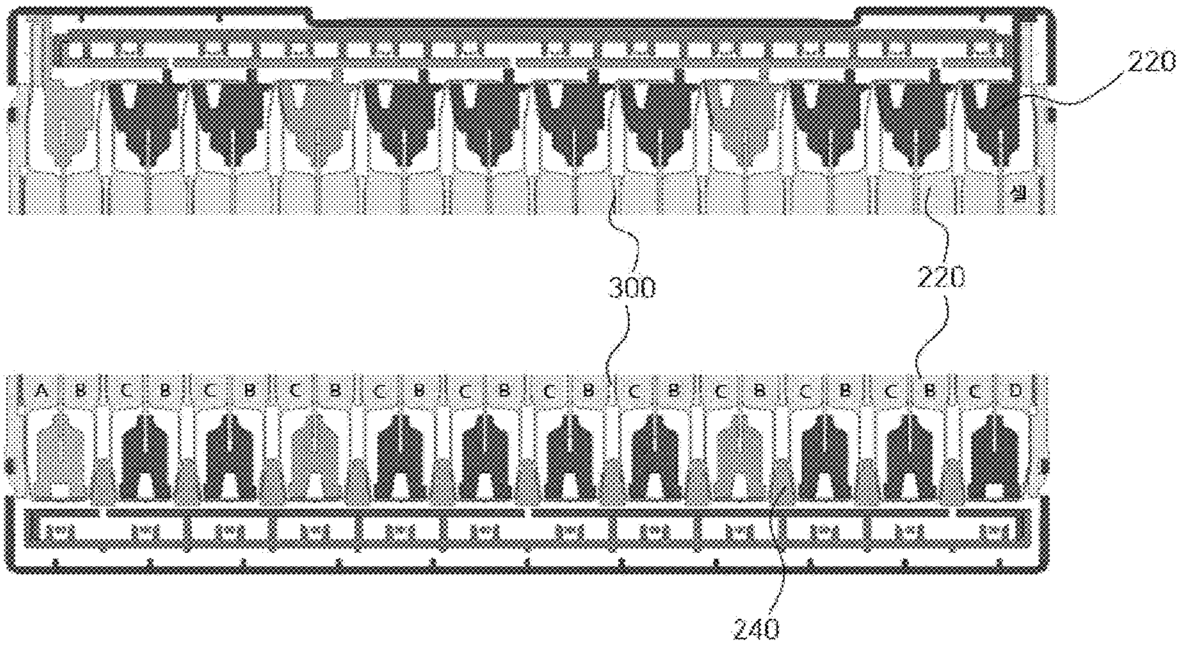
FIG. 5 is a reference view for describing cell tab bending and configurations of a surface pressure pad and a cooling fin according to an exemplary embodiment of the present disclosure.

FIGS. 1A and 1B are reference views for describing a battery module assembly having a cell tab shape and a cartridge assembly shape for enhancing insulating performance according to an exemplary embodiment of the present disclosure, FIGS. 2A and 2B are reference views for describing coupling between a cartridge assembly, a battery cell, and a sensing assembly according to an exemplary embodiment of the present disclosure, FIGS. 3A and 3B are reference views for describing cell tab bending according to an exemplary embodiment of the present disclosure, FIG. 4 is a reference view for describing coupling between a cartridge assembly, a battery cell, and an adapter according to an exemplary embodiment of the present disclosure, and FIG. 5 is a reference view for describing cell tab bending and configurations of a surface pressure pad and a cooling fin according to an exemplary embodiment of the present disclosure.

Referring to FIGS. 1A and 1B, a battery module assembly 100 according to an exemplary embodiment of the present disclosure includes a plurality of unit modules 200 stacked in the horizontal direction.

The plurality of stacked unit modules 200 are assembled by a fastening means such as a long bolt.

Each of the unit modules 200 may include a battery cell 210, a plurality of cartridge assemblies 220, an adapter 240, and a sensing assembly 250.

Here, a plurality of battery cells 210 may have electrode terminals formed on one side and may stand in a lateral direction.

The plurality of cartridge assemblies 220 may fix the plurality of battery cells 210, and when the plurality of cartridge assemblies 220 are connected to each other, adapters 240 may be connected to gaps between the rear surfaces of the plurality of cartridge assemblies 220.

The sensing assembly 250 may be mounted to the upper ends of the plurality of cartridge assemblies 220 and assembled thereto.

Meanwhile, the adapters 240 have been described as being connected to the gaps between the rear surfaces of the plurality of cartridge assemblies 220, but may be connected between the front surfaces of the plurality of cartridge assemblies 220 depending on the use environments and specifications of the cartridge assemblies 220.

Also, the battery module assembly 100 having a cell tab shape and a cartridge assembly shape for enhancing insulating performance may further include a cover member 260 that includes side covers 261 connected to both side surfaces, a front cover 262 for covering the front surface of the module, a rear cover 263 for covering the rear surface, and an upper cover 268 for covering the upper surface.

The plurality of battery module assemblies 100 may be coupled by both side covers 261 having a pin/hole structure.

In more detail, the pin/hole structure may have a structure in which protrusions are formed at the left lower end and the right lower end of the side covers 261, and holes are formed at the left upper end and the right upper end.

Meanwhile, although the protrusions are illustrated as being formed at the left lower end and the right lower end of the side covers 261 while the holes are illustrated as being formed at the left upper end and the right upper end of the side covers 261 as described above, the protrusions may be formed at the left upper end and the right upper end of the side covers 261, and the holes may be formed at the left lower end and the right lower end of the side covers 261, but the exemplary embodiment is not limited thereto.

Referring to FIG. 2A, FIG. 2A is a reference view for describing the thicknesses of a cartridge assembly 220 and a battery cell 210.

Each of the plurality of cartridge assemblies 220 may include a cartridge member 230 for forming a body of the cartridge assembly 220 and a cooling fin 232 inserted into the cartridge member 230. Here, the battery cell 210 may be in close contact with each of one side surface of the cooling fin 232 and the other side surface on the opposite side thereof. In this case, the battery cells 210 may be efficiently cooled by heat conduction between the cooling fin 232 and the battery cells 210. Meanwhile, in one example, the thickness of the cartridge assembly 220 may be greater than the thickness of a pair of the battery cells 210.

Here, the thickness of the cartridge assembly 220 is greater than the thickness of the pair of battery cells 210, and thus the plurality of cartridge assemblies 220 are in contact with each other. Thus, partitions used in the related art between cartridge assemblies may be unnecessary.

The present disclosure may have the effect of reducing the costs, weight, and volume in that the partitions are not added, and may directly connect the sensing assembly 250 (see FIG. 1) to the cartridge assemblies 220.

Also, the thickness of the cartridge assembly 220 is greater than the thickness of the pair of the battery cells 210 in a state in which the plurality of cartridge assemblies 220 are in contact with each other. Accordingly, a certain gap is created between regions of the battery cells 210, and a surface pressure pad 300 may be provided in this certain gap.

This surface pressure pad 300 is located between the pair of battery cells 210 and another pair of battery cells 210 adjacent to the battery cell 210, and may allow the pair of battery cells 210 to be subjected to constant pressure even when the gap between the pair of battery cells 210 and another pair of battery cells 210 is changed due to a change in thickness of the battery cell 210.

Referring to FIG. 2B, FIG. 2B is a reference view for describing a connection between the cartridge assembly 220 and the sensing assembly 250.

Each of the plurality of cartridge assemblies 220 may include, in the front region and the rear region, lower sensing assembly connection holes 221*a* that may be connected to the sensing assembly 250.

Also, the sensing assembly 250 may include cartridge connection protrusions 252 in the front region and the rear region of the sensing assembly 250, and the cartridge connection protrusions 252 may be connected to the lower sensing assembly connection holes 221*a* provided in the cartridge assembly 220.

Also, the cartridge connection protrusions 252 may include fixing portions having a hook shape at the inner end, and the fixing portions having a hook shape may be inserted into openings (holes) of the lower sensing assembly connection holes 221*a* and coupled thereto.

Meanwhile, the lower sensing assembly connection holes 221*a* have been described as being formed in the front region and the rear region of the cartridge assembly 220, but when the lower sensing assembly connection holes 221*a* may not be formed depending on the use environments or specifications of the cartridge assemblies 220, a component having the same function as each of the lower sensing assembly connection holes 221*a* may be formed in the adapter 240.

Referring to FIG. 3A, FIG. 3A is a reference view for describing front region-cell tab bending of the battery module assembly 100 having a cell tab shape and a cartridge assembly shape for enhancing insulating performance.

Front region-cell tabs 210_1 of the battery module assembly 100 having a cell tab shape and a cartridge assembly shape are bent in the same direction and thus spaced a certain distance from each other, thereby securing an insulating distance by this certain distance.

Also, cell tabs 210_1 at both ends of the plurality of cartridge assemblies 220 may not be bent in the same direction but bent parallel to the side covers. Thus, a width of the certain distance securing the insulating distance may be less than cell tab regions at both ends.

Referring to FIG. 3B, FIG. 3B is a reference view for describing rear region-cell tab bending of the battery module assembly 100 having a cell tab shape and a cartridge assembly shape for enhancing insulating performance.

Rear region-cell tabs 210_1 of the battery module assembly 100 are bent in directions facing each other and thus overlap each other. Accordingly, a certain distance is not created, and an insulating distance is not secured. Thus, the adapter 240 may be added in a gap between the plurality of cartridge assemblies 220.

Referring to FIGS. 4 and 5, in the battery module assembly 100 having a cell tab shape and a cartridge assembly shape, the cartridge assembly 220, the battery cell 210, and a cooling fin are connected in the front region and the rear region. In the front region, the adapter 240 may be unnecessary due to the cell tab bending in the same direction, but in the rear region, the adapter 240 may be provided between the cartridge assemblies due to the cell tab bending in different directions.

Also, the cell tab bending shape and the cartridge assembly shape at both ends in the front region may be different from the cell tab bending shape and the cartridge assembly shape at both ends, but the cell tab bending shape and the cartridge assembly shape at both ends in the rear region may be the same as the cell tab bending shape and the cartridge assembly shape at both ends.

Figure 6:
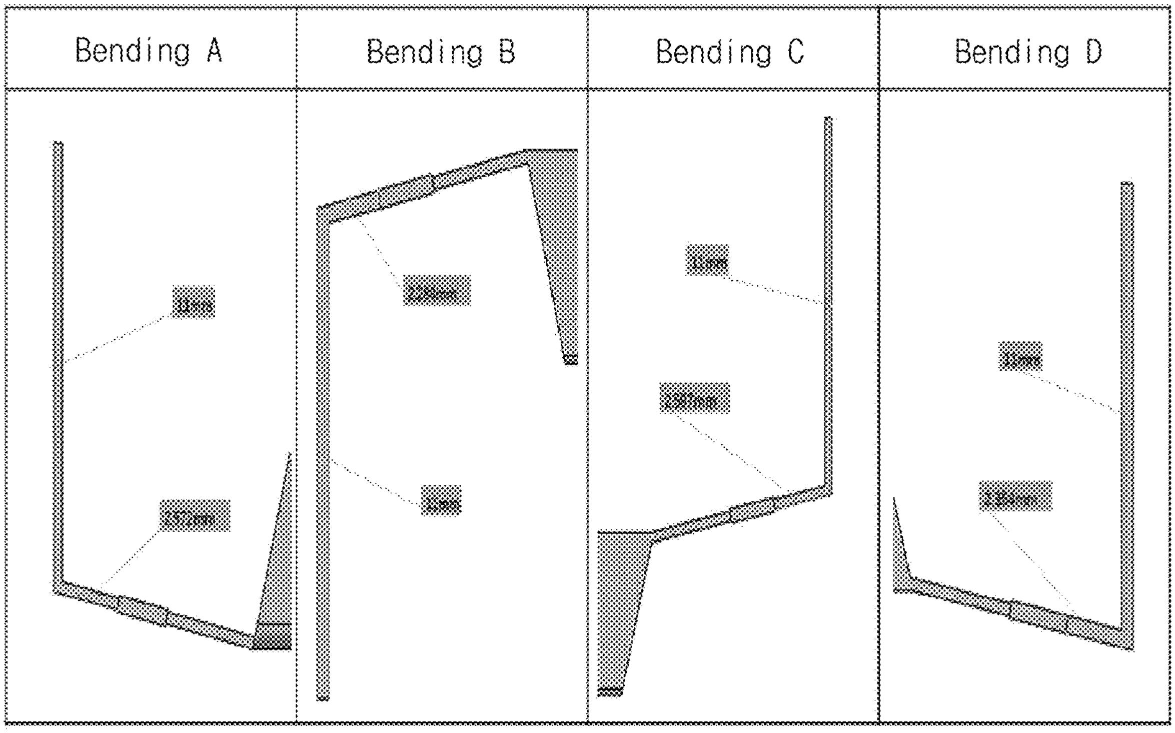
FIG. 6 is a reference view for describing cell tab bending types according to an exemplary embodiment of the present disclosure.

Referring to FIGS. 5 and 6, in battery cell-types A to D, cell tab cutting of about 13.5 mm is performed using aluminum (+) of 0.4 t and copper (−) of 0.2 t.

In the cell-type A, aluminum may not be bent, and copper may be bent in a bending A shape. Also, in the cell-type B, aluminum may be bent in a bending B shape, and copper may be bent in a bending C shape. In the cell-type C, aluminum may be bent in a bending D shape, and copper may be bent in a bending A shape. In the cell-type D, aluminum may be bent in a bending B shape, and copper may not be bent.

Second Embodiment

Figure 7:
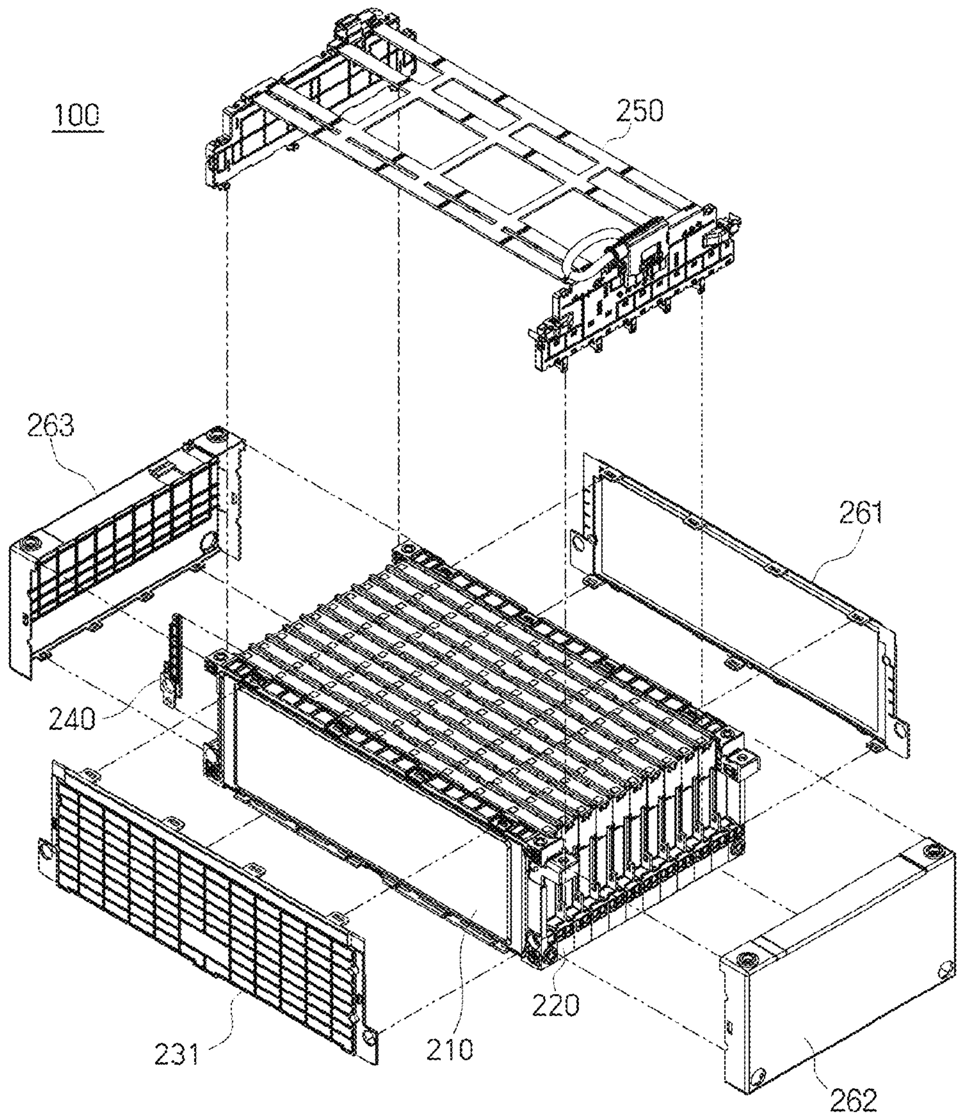
FIG. 7 is an exploded perspective view showing a state in which a battery module assembly according to an exemplary embodiment of the present disclosure is disassembled.
Figure 8:
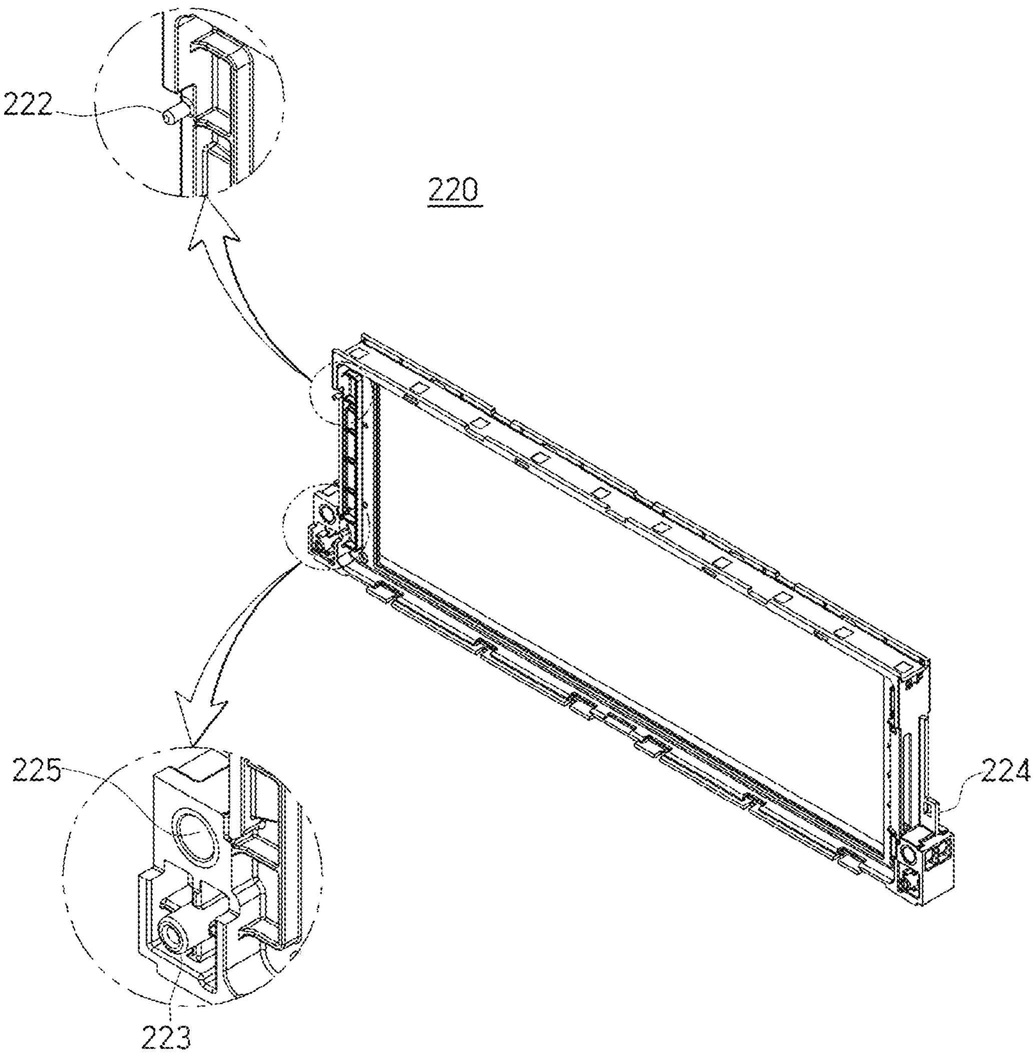
FIG. 8 is a perspective view showing a cartridge assembly of a battery module assembly according to an exemplary embodiment of the present disclosure.
Figure 9:
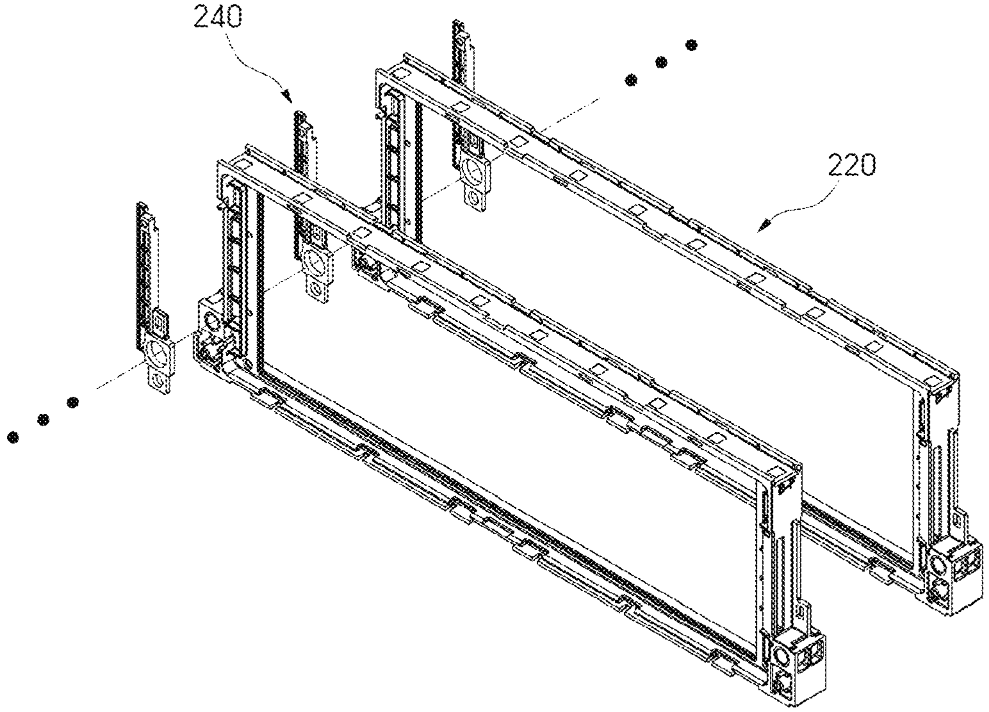
FIG. 9 is an exploded perspective view showing a cartridge assembly and an adapter of a battery module assembly according to an exemplary embodiment of the present disclosure.
Figure 10:
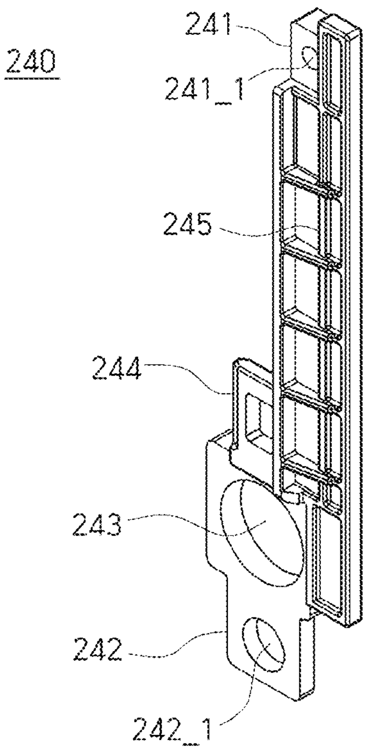
FIG. 10 is a perspective view showing an adapter of a battery module assembly according to an exemplary embodiment of the present disclosure.
Figure 11:
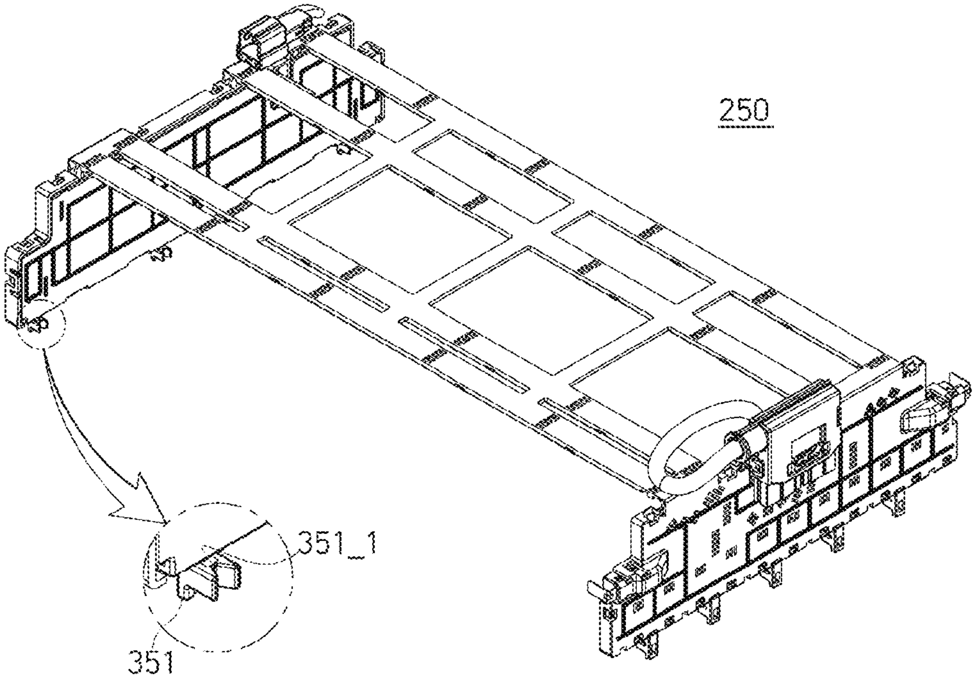
FIG. 11 is a perspective view showing a sensing assembly of a battery module assembly according to an exemplary embodiment of the present disclosure.
Figure 12:
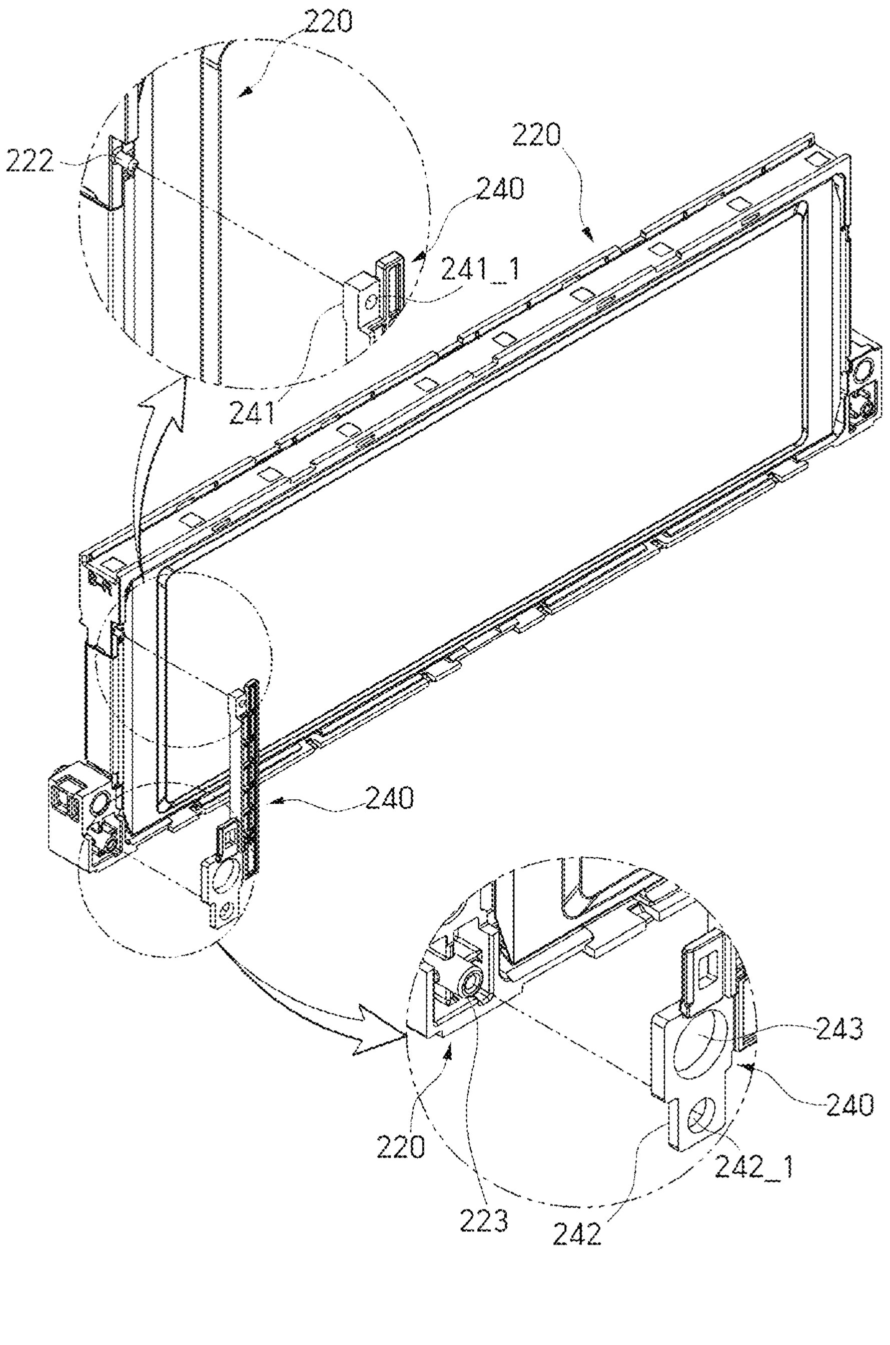
FIG. 12 is an exploded perspective view showing a coupled structure between a cartridge assembly and an adapter according to an exemplary embodiment of the present disclosure.
Figure 13:
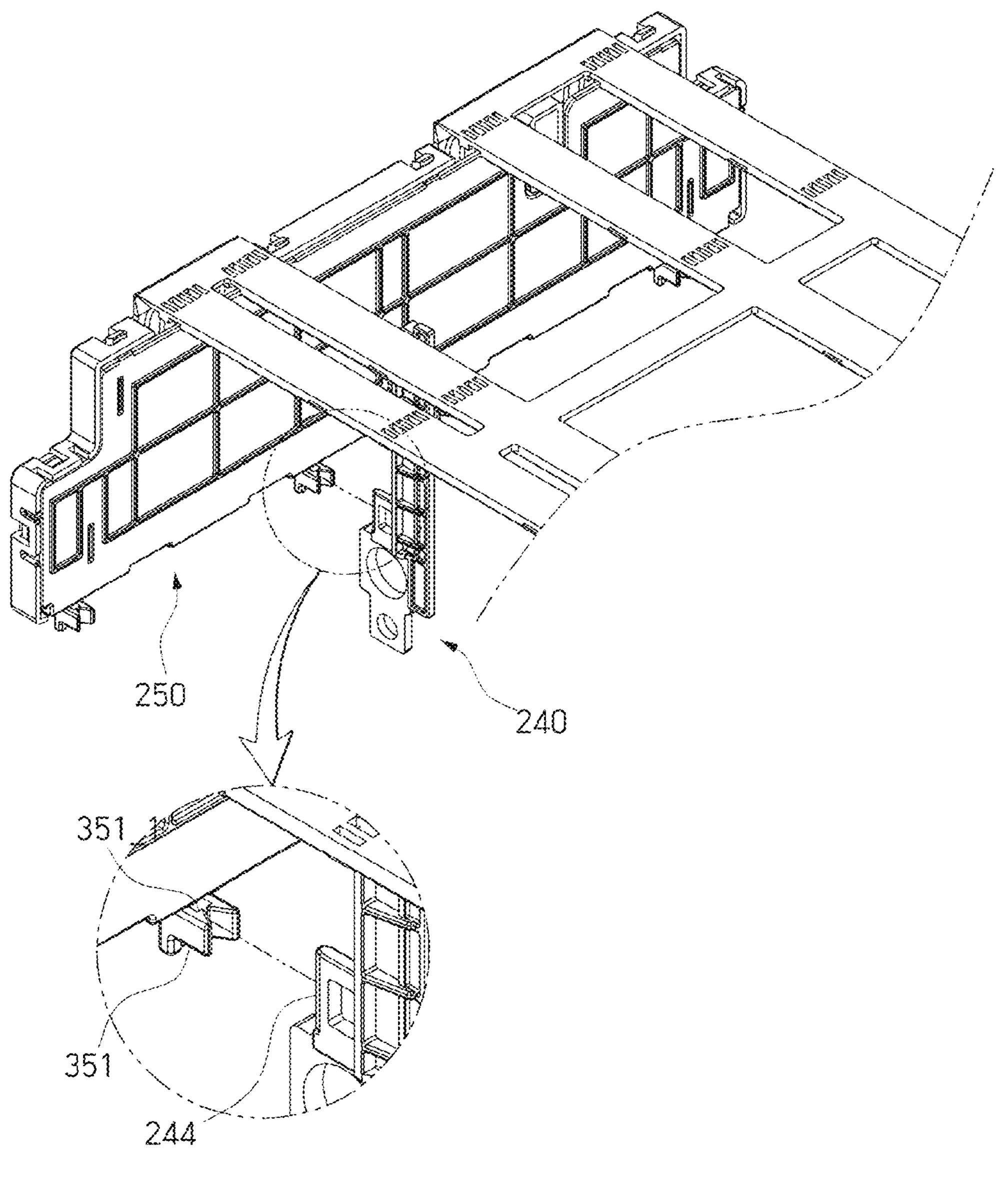
FIG. 13 is an exploded perspective view showing a coupled structure between an adapter and a sensing assembly according to an exemplary embodiment of the present disclosure.

FIG. 7 is an exploded perspective view showing a state in which a battery module assembly according to an exemplary embodiment of the present disclosure is disassembled, FIG. 8 is a perspective view showing a cartridge assembly of a battery module assembly according to an exemplary embodiment of the present disclosure, FIG. 9 is an exploded perspective view showing a cartridge assembly and an adapter of a battery module assembly according to an exemplary embodiment of the present disclosure, FIG. 10 is a perspective view showing an adapter of a battery module assembly according to an exemplary embodiment of the present disclosure, FIG. 11 is a perspective view showing a sensing assembly of a battery module assembly according to an exemplary embodiment of the present disclosure, FIG. 12 is an exploded perspective view showing a coupled structure between a cartridge assembly and an adapter according to an exemplary embodiment of the present disclosure, and FIG. 13 is an exploded perspective view showing a coupled structure between an adapter and a sensing assembly according to an exemplary embodiment of the present disclosure.

Referring to FIGS. 7 and 8, a battery module assembly 100 according to an exemplary embodiment of the present disclosure includes a plurality of unit modules 200 stacked in the horizontal direction.

The plurality of stacked unit modules 200 are assembled by a fastening means such as a long bolt.

Each of the unit modules 200 includes a battery cell 210, a plurality of cartridge assemblies 220, an adapter 240, and a sensing assembly 250.

For example, the battery cell 210 may include a pouch-type cell. Also, a surface pressure pad 300 may be provided between the unit modules 200 adjacent to each other, and the surface pressure pad 300 may be provided in close contact with the battery cell 210 provided in each of the unit modules 200 adjacent to each other and press the battery cells 210.

Also, the battery cell 210 may have electrode terminals formed on both sides.

The unit module may be provided with one cartridge assembly 220 and two battery cells 210. This may be because one battery cell 210 is provided in close contact with each of both sides of a cooling fin 232 of the cartridge assembly 220.

This cartridge assembly 220 includes an upper adapter connection portion 222, a lower adapter connection portion 223, a sensing assembly connection hole 224, and a first long bolt assembly hole 225.

The upper adapter connection portion 222 is formed at the upper end on one side surface of each of the plurality of cartridge assemblies 220, and the lower adapter connection portion 223 is formed at the lower end on one side surface of each of the plurality of cartridge assemblies 220.

Also, the upper adapter connection portion 222 and the lower adapter connection portion 223 protrude to be connected to the adapter 240.

Meanwhile, although the drawing illustrates that the size of a protrusion of the upper adapter connection portion 222 of the cartridge assembly 220 is smaller than that of the lower adapter connection portion 223, the size of the protrusion of the upper adapter connection portion 222 may be greater than or equal to that of the lower adapter connection portion 223 depending on the structure of the cartridge assembly, and the exemplary embodiment is not limited thereto.

The sensing assembly connection hole 224 is formed at the lower end on the other surface of each of the plurality of cartridge assemblies 220, and is connected to the sensing assembly 250.

The first long bolt assembly hole 225 is formed at the lower end on one side surface of the cartridge assembly 220, and a long bolt passes through the same.

Also, the long bolt passes through the first long bolt assembly holes 225 to connect the plurality of cartridge assemblies 220 to each other.

Referring to FIGS. 9 and 10, when the plurality of cartridge assemblies 220 are connected to each other, the adapter 240 may be located between the plurality of cartridge assemblies 220, that is, between a pair of cartridge assemblies 220, of which surfaces are adjacent to each other, among the plurality of cartridge assemblies 220.

This adapter 240 includes an upper cartridge assembly portion 241, a lower cartridge assembly portion 242, a second long bolt assembly hole 243, a sensor assembly portion 244, and a bending prevention member 245.

An upper hole 241_1 and a lower hole 242_1, to which the cartridge assembly 220 is coupled, are formed in the upper cartridge assembly portion 241 and the lower cartridge assembly portion 242, respectively.

Also, the upper adapter connection portion 222 of the cartridge assembly 220 passes through the upper hole 241_1, and the lower adapter connection portion 223 of the cartridge assembly 220 passes through the lower hole 242_1.

Thus, the upper cartridge assembly portion 241 is coupled to the upper adapter connection portion 222 of the cartridge assembly 220 by the upper hole 241_1, and the lower cartridge assembly portion 242 is coupled to the lower adapter connection portion 223 of the cartridge assembly 220 by the lower end 242_1.

Meanwhile, although the drawing illustrates that the upper hole 241_1 formed in the upper cartridge assembly portion 241 is smaller than the lower hole 242_1 formed in the lower cartridge assembly portion 242, the upper hole 241_1 formed in the upper cartridge assembly portion 241 may be greater than or equal to the lower hole 242_1 formed in the lower cartridge assembly portion 242 depending on the structure of the cartridge assembly, and the exemplary embodiment is not limited thereto.

The second long bolt assembly hole 243 is formed at the lower end on one side surface of the adapter 240, and a long bolt passes through the same.

Also, the long bolt passes through the second long bolt assembly holes 243 to connect the plurality of adapters 240 to each other.

These second long bolt assembly holes 243 communicate with the first long bolt assembly holes 225 that connect the plurality of cartridge assemblies 220.

Therefore, the long bolt may pass through the first long bolt assembly holes 225 and the second long bolt assembly holes 243 and couple the plurality of cartridge assemblies 220 and the plurality of adapters 240 to each other.

The sensor assembly portion 244 is formed above the second long bolt assembly hole 243 on one side surface of the adapter 240 and coupled to the sensing assembly 250.

The bending prevention member 245 is formed on the front surface of the adapter 240 and may have a structure in which grids are spaced a certain distance from each other.

That is, the bending prevention member 245 prevents the adapter 240 from being bent due to external force.

Referring to FIG. 11, the sensing assembly 250 may be manufactured by bending the ends of both sides of a plate-shaped injection molded object into a "⌉" shape, and is mounted above the plurality cartridge assemblies 220 and fixed to the adapter 240.

Also, the sensing assembly 250 have bus bars at the ends of the bent portions of the sensing assembly 250 and is brought into contact with and welded to a battery cell lead portion exposed from the side surface of the assembly of the plurality of unit modules 200.

The sensing assembly 250 includes adapter connection protrusions 351.

The adapter connection protrusions 351 protrude from the lower ends of both side surfaces of the sensing assembly 250, and may be connected to the sensor assembly portions 244 of the adapters 240.

Each of the adapter connection protrusions 351 may have, at an end, a hook-shaped fixing portion 351_1 connected to the sensor assembly portion 244.

The fixing portion 351_1 may be coupled to the hole of the sensor assembly portion 244 in a hook coupling manner.

That is, the sensing assembly 250 may be coupled to the cartridge assembly 220 using the fixing portions 351_1.

Meanwhile, the battery module assembly 100 may further include a cover member 260 that includes side covers 261 connected to both side surfaces, a front cover 262 for covering the front surface of the module, a rear cover 263 for covering the rear surface, and an upper cover 268 for covering the upper surface.

Hereinafter, the coupling relationship between the cartridge assembly and the adapter will be described in detail with reference to drawings.

Referring to FIG. 12, the protrusions of the upper adapter connection portion 222 and the lower adapter connection portion 223 may be connected and assembled to the holes of the upper cartridge assembly portion 241 and the lower cartridge assembly portion 242, respectively.

Also, the long bolt passes through the first long bolt assembly holes 225 of the cartridge assemblies 220 and the second long bolt assembly holes 243 of the adapter 240 to assemble and fix the same.

Hereinafter, the coupling relationship between the adapter and the sensing assembly will be described in detail with reference to drawings.

FIG. 13 is an exploded perspective view showing a coupled structure between an adapter and a sensing assembly according to an exemplary embodiment of the present disclosure.

The adapter connection protrusion 351 of the sensing assembly 250 is connected to the sensor assembly portion 244 of the adapter 240.

The adapter connection protrusion 351 has, at the end, the hook-shaped fixing portion 351_1 connected to the sensor assembly portion 244, and the fixing portion 351_1 is coupled to the sensor assembly portion 244 in a hook coupling manner.

That is, the fixing portion 351_1 is coupled to the sensor assembly portion 244 in a hook coupling manner, and thus the sensing assembly 250 may be fixed to the adapter 240.

Third Embodiment

Figure 14A:
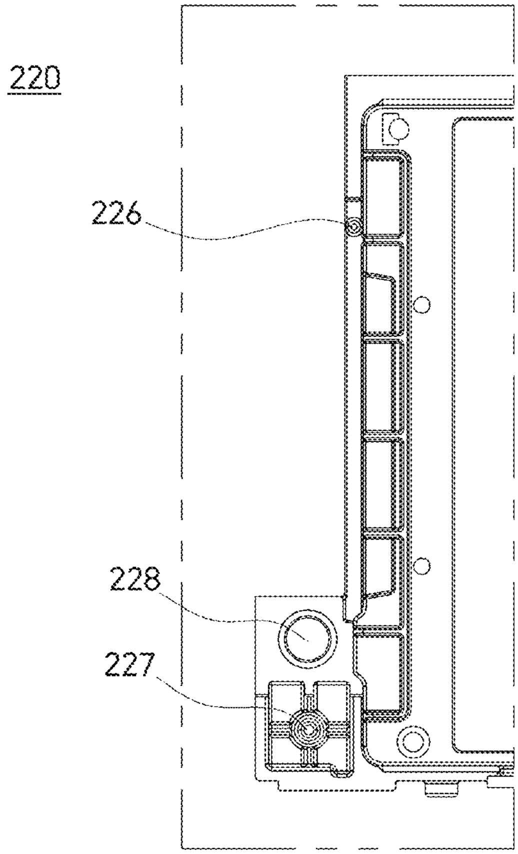
FIGS. 14A to 14D are reference views for describing a sensing assembly and a cartridge assembly provided with a sensing assembly-assembling hole structure according to an exemplary embodiment of the present disclosure.
Figure 14B:
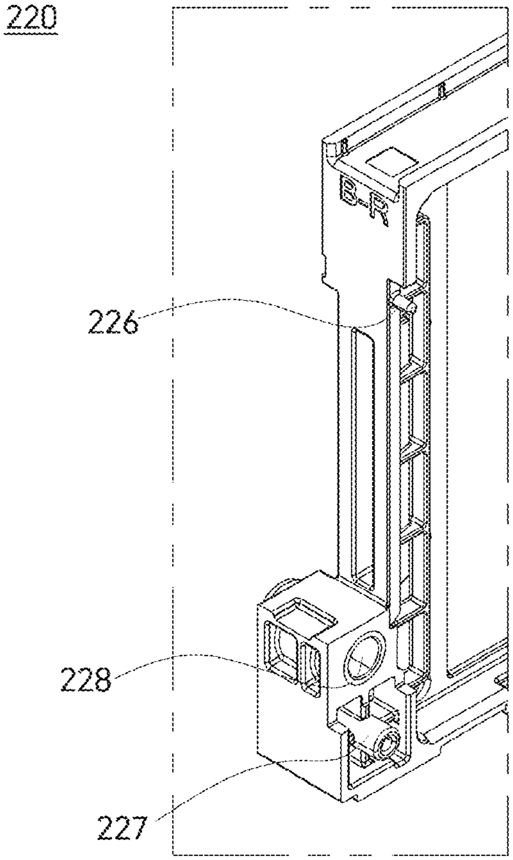
Figure 14C:
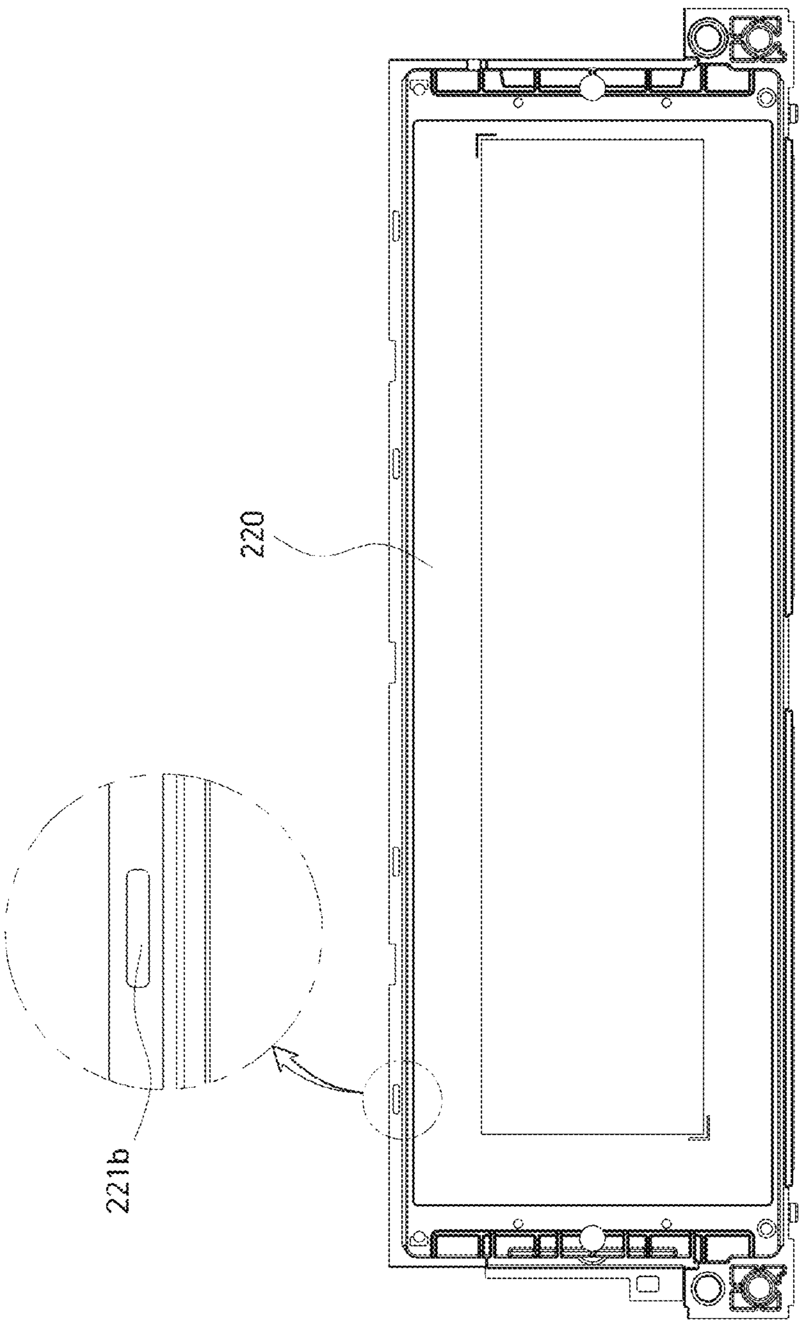
Figure 14D:
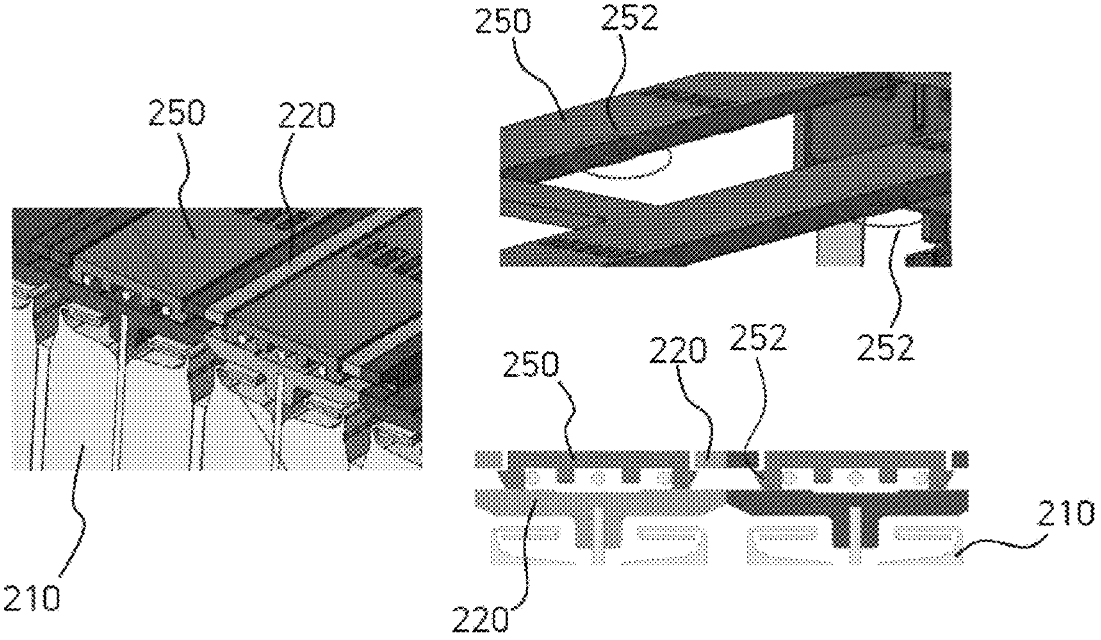
Figure 15A:
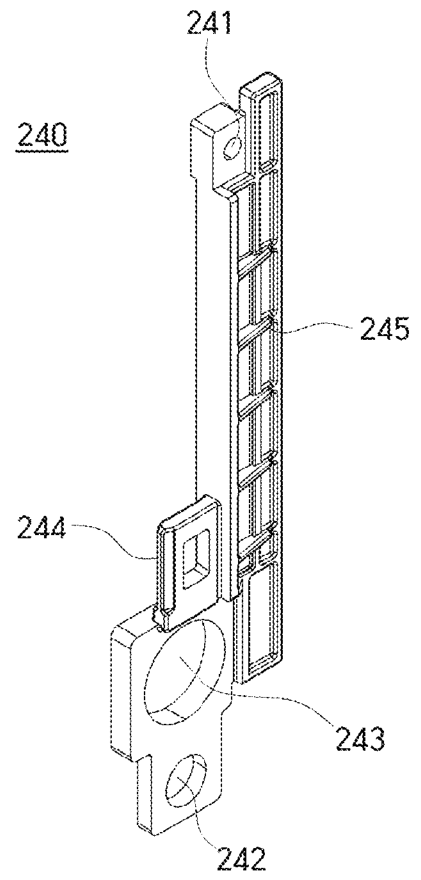
FIGS. 15A to 15C are reference views for describing an adapter according to an exemplary embodiment of the present disclosure.
Figure 15B:
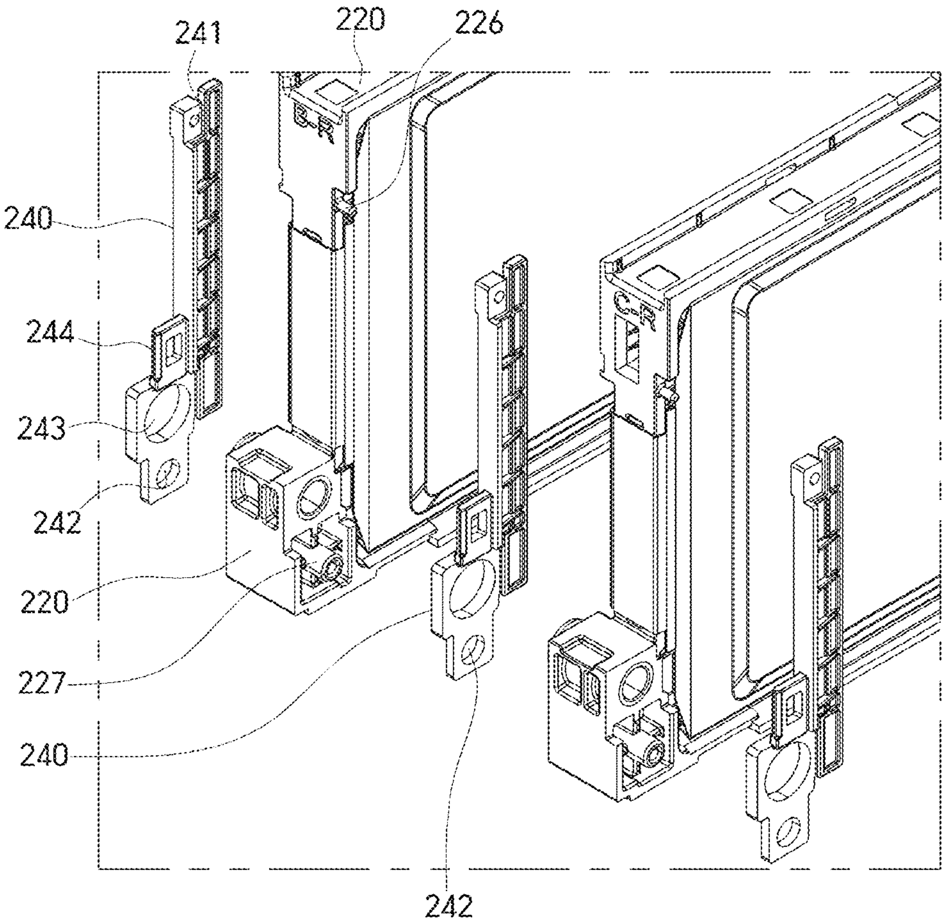
Figure 15C:
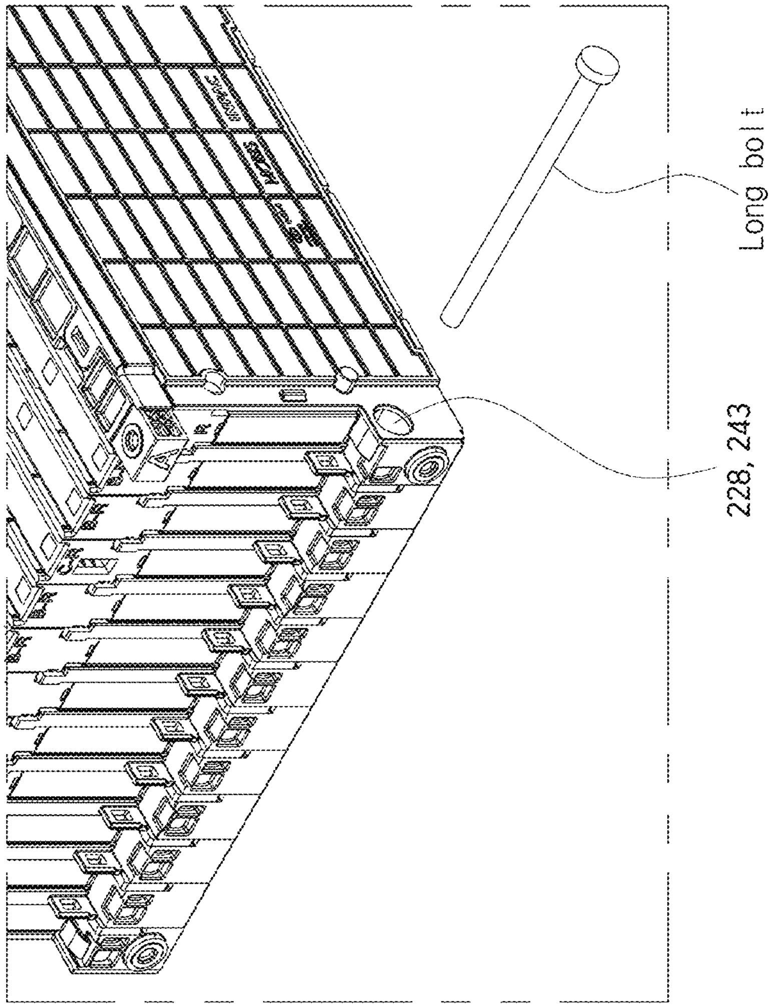
Figure 16A:
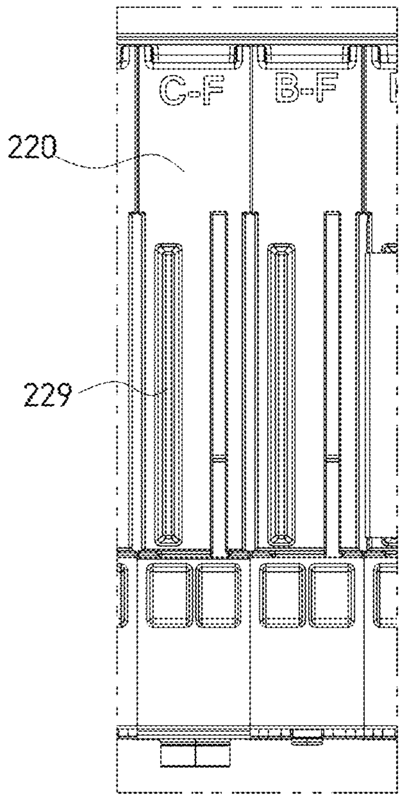
FIGS. 16A and 16B are reference views for describing welding avoiding holes of the front surface and the rear surface according to an exemplary embodiment of the present disclosure.
Figure 16B:
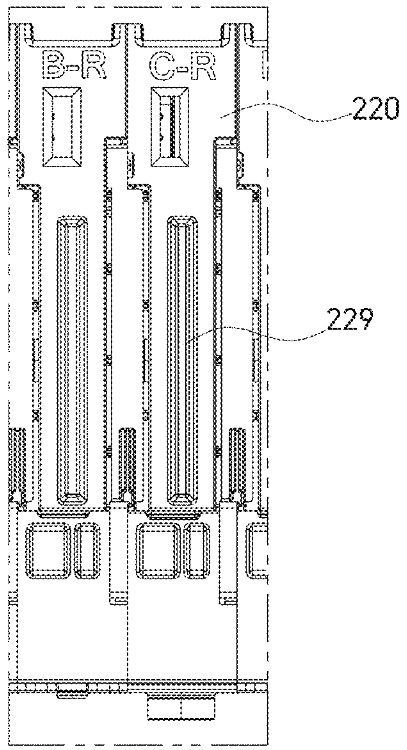
Figure 17A:
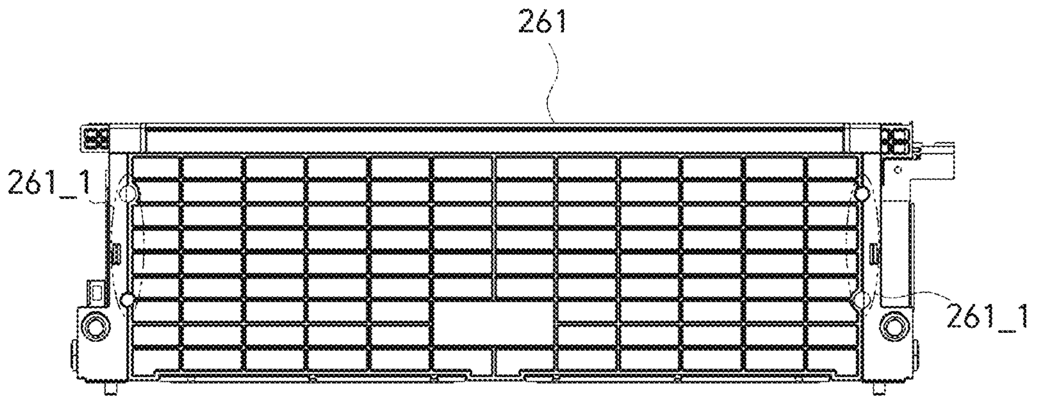
FIGS. 17A and 17B are reference views for describing a side cover according to an exemplary embodiment of the present disclosure.
Figure 17B:
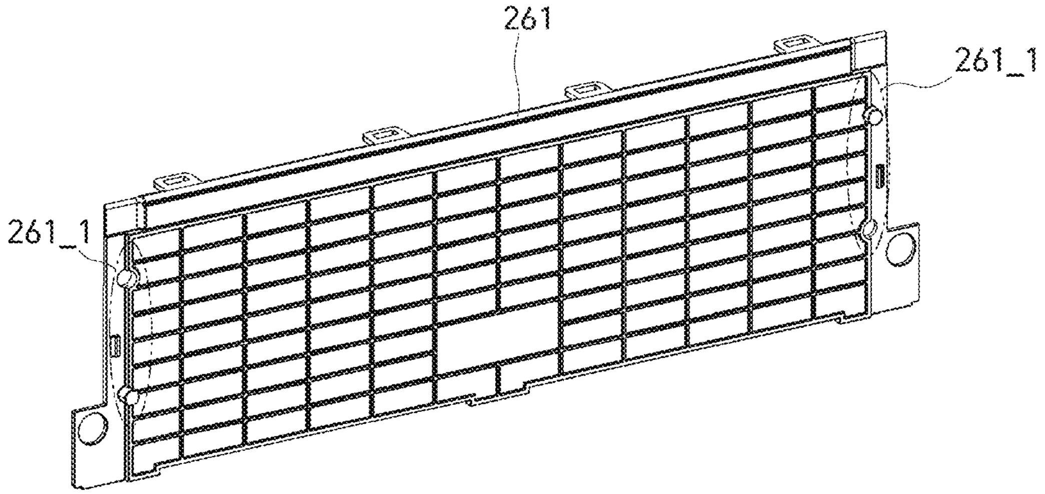
Figure 18:
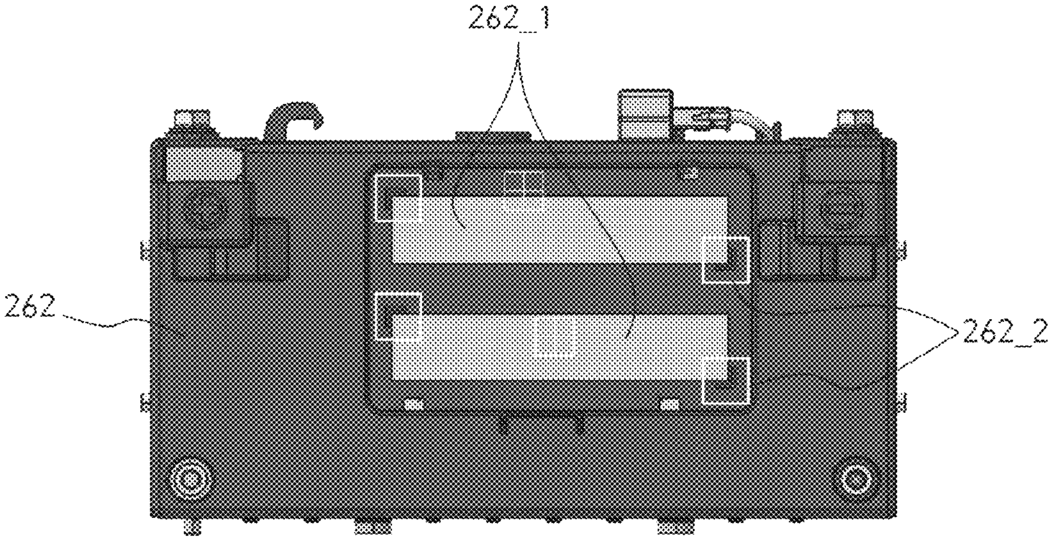
FIG. 18 is a reference view for describing a front cover according to an exemplary embodiment of the present disclosure.

FIGS. 14A to 14C are reference views for describing a sensing assembly and a cartridge assembly provided with a sensing assembly-assembling hole structure according to an exemplary embodiment of the present disclosure, FIGS. 15A to 15C are reference views for describing an adapter according to an exemplary embodiment of the present disclosure, FIGS. 16A and 16B are reference views for describing welding avoiding holes of the front surface and the rear surface according to an exemplary embodiment of the present disclosure, FIGS. 17A and 17B are reference views for describing a side cover according to an exemplary embodiment of the present disclosure, and FIG. 18 is a reference view for describing a front cover according to an exemplary embodiment of the present disclosure.

Referring to FIGS. 14A to 14C, a battery module assembly 100 according to an exemplary embodiment of the present disclosure includes a plurality of unit modules 200 stacked in the horizontal direction.

The plurality of stacked unit modules 200 are assembled by a fastening means such as a long bolt.

Each of the unit modules 200 may include a battery cell 210, a plurality of cartridge assemblies 220, an adapter 240, and a sensing assembly 250.

In more detail, a plurality of battery cells 210 may have electrode terminals formed on one side and may stand in a lateral direction.

The plurality of cartridge assemblies 220 may fix the plurality of battery cells 210.

Also, adapters 240 may be connected between the rear surfaces of the plurality of cartridge assemblies 220 when the plurality of cartridge assemblies 220 are connected to each other.

FIGS. 14A to 14D are reference views for describing a sensing assembly 250 and a cartridge assembly 220 provided with a sensing assembly-assembling hole structure according to an exemplary embodiment of the present disclosure.

The plurality of cartridge assemblies 220 may include, at the upper end and the lower end of the side surface of the rear portion of the cartridge assembly 220, adapter connection portions 226 and 227 that protrude to be connected to the adapter 240.

Here, a protrusion of the upper adapter connection portion 226 on the side surface of the rear portion of the cartridge assembly 220 may be smaller than a protrusion of the lower adapter connection portion 227.

Also, the plurality of cartridge assemblies 220 may include third long bolt assembly holes 228 through which a long bolt pass so as to assemble the plurality of cartridge assemblies 220 and the plurality of adapters 240.

The upper portions of the plurality of cartridge assemblies 220 may be connected to the sensing assembly 250. Here, the plurality of cartridge assemblies 220 may have a plurality of upper sensing assembly connection holes **221*b* so that the plurality of cartridge assemblies 220 are connected to the sensing assembly 250. The sensing assembly 250 may include, on the inner surface of the upper end, a plurality of cartridge connection protrusions 252**.

The connection between the cartridge assembly 220 and the sensing assembly 250 may be established as the plurality of cartridge connection protrusions 252 of the sensing assembly 250 are inserted into the upper sensing assembly connection holes **221*b* of the cartridge assembly 220**.

Referring to FIG. 15A, the adapter 240 may include cartridge assembly-assembling portions 241 and 242, a second long bolt assembly holes 243, and a sensor assembly portion 244.

The cartridge assembly-assembling portions 241 and 242 may be connected to adapter connection portions 226 and 227 of the cartridge assembly 220.

The upper adapter connection portion 226 may be connected to the upper cartridge assembly portion 241, the lower adapter connection portion 227 may be connected to the lower cartridge assembly portion 242, and a hole of the upper cartridge assembly portion 241 may be smaller than a hole of the lower cartridge assembly portion 242.

Also, the adapter 240 may have a bending prevention member 245, and the bending prevention member 245 may have a structure of grids spaced a certain distance from each other.

Referring to FIG. 15B, protrusions of the adapter connection portions 226 and 227 may be inserted into the holes of the cartridge assembly portions 241 and 242 and assembled thereto.

Referring to FIG. 15C, third long bolt assembly holes 228 of the cartridge assemblies 220 and second long bolt assembly holes 243 of the adapters 240, which are connected by the adapter connection portions 226 and 227 of the cartridge assemblies 220 and the cartridge assembly-assembling portions 241 and 242 of the adapters 240, may be assembled and fixed to each other as a long bolt passes therethrough.

Referring to FIGS. 16A and 16B, a welding avoiding hole 229 may be provided at the middle of each of the front region FRT and the rear region RR of the cartridge assembly 220.

In the front region of the cartridge assembly 220, the welding avoiding hole 229 may be provided on the middle in the up-down direction and the left in the left-right direction. In the rear region of the cartridge assembly 220, the welding avoiding hole 229 may be provided on the middle in the up-down direction and the middle in the left-right direction.

Meanwhile, the battery module including the cartridge assembly provided with the sensing assembly-assembling hole structure may further include a cover member 260 that includes side covers 261 connected to both side surfaces, a front cover 262 for covering the front surface of the module, a rear cover 263 for covering the rear surface, and an upper cover 268 for covering the upper surface.

Referring to FIGS. 17A and 17B, the side cover 261 may cover both side surfaces of the cartridge assemblies 220 and may have pin and hole structures in which the left and right configurations are different from each other to connect unit modules.

More specifically, a right side cover may be configured to protect each side surface of the cartridge assembly 220 at both ends. Protrusions may be formed at the left lower end and the right lower end of the right side cover so as to be connected to a left side cover of another unit module that faces the right side cover, and holes may be formed at the left upper end and the right upper end (see the reference numerals 261_1 FIGS. 17A and 17B).

On the other hand, a left side cover does not extend at both ends, and the length of the upper end is smaller than the length of the lower end in which a lower long bolt connection portion is provided. Protrusions (pins) may be formed at the left lower end and the right lower end so as to be connected to a right side cover of a unit module that faces the left side cover, and holes may be formed at the left upper end and the right upper end (see the reference numerals 261_1 FIGS. 17A and 17B).

Referring to FIG. 18, FIG. 18 shows the front cover 262 for covering the front region, and the front cover 262 may include cell management unit (CMU) abrasion prevention pads 262_1 and pad attachment guide portions 262_2.

The front cover 262 includes the CMU abrasion prevention pads 262_1 to prevent a CMU from being worn down during harsh condition tests such as vibration and impact, and each of the CMU abrasion prevention pads 262_1 may have various thicknesses and materials depending on components and test conditions.

Also, the pad attachment guide portions 262_2 show guide lines to attach the CMU abrasion prevention pads 262_1 to the accurate positions and may have support shapes at the left upper end and the right lower end to show the attachment positions of the pads.

Fourth Embodiment

Figure 19:
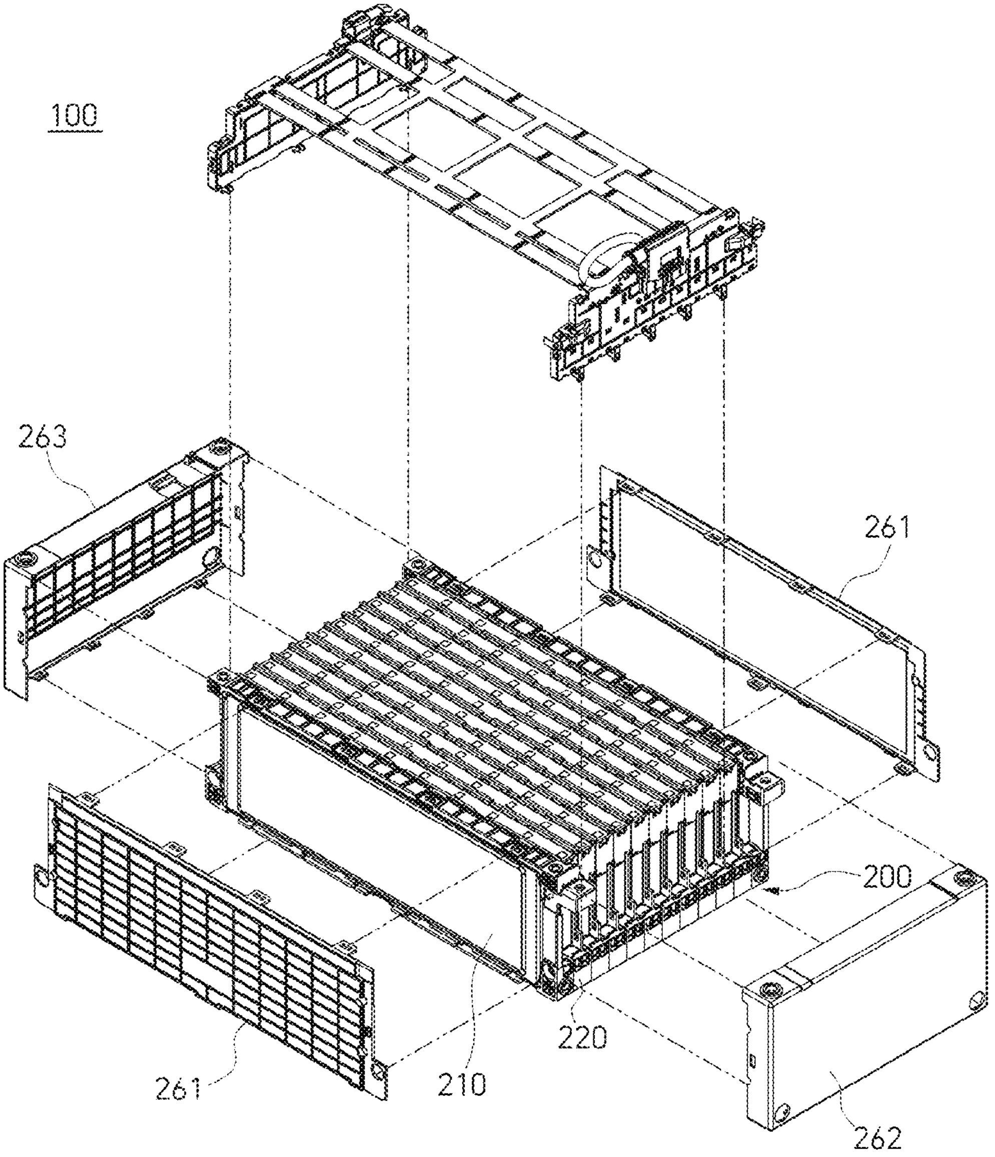
FIG. 19 is an exploded perspective view showing a state in which a battery module assembly according to an exemplary embodiment of the present disclosure is disassembled.
Figure 20:
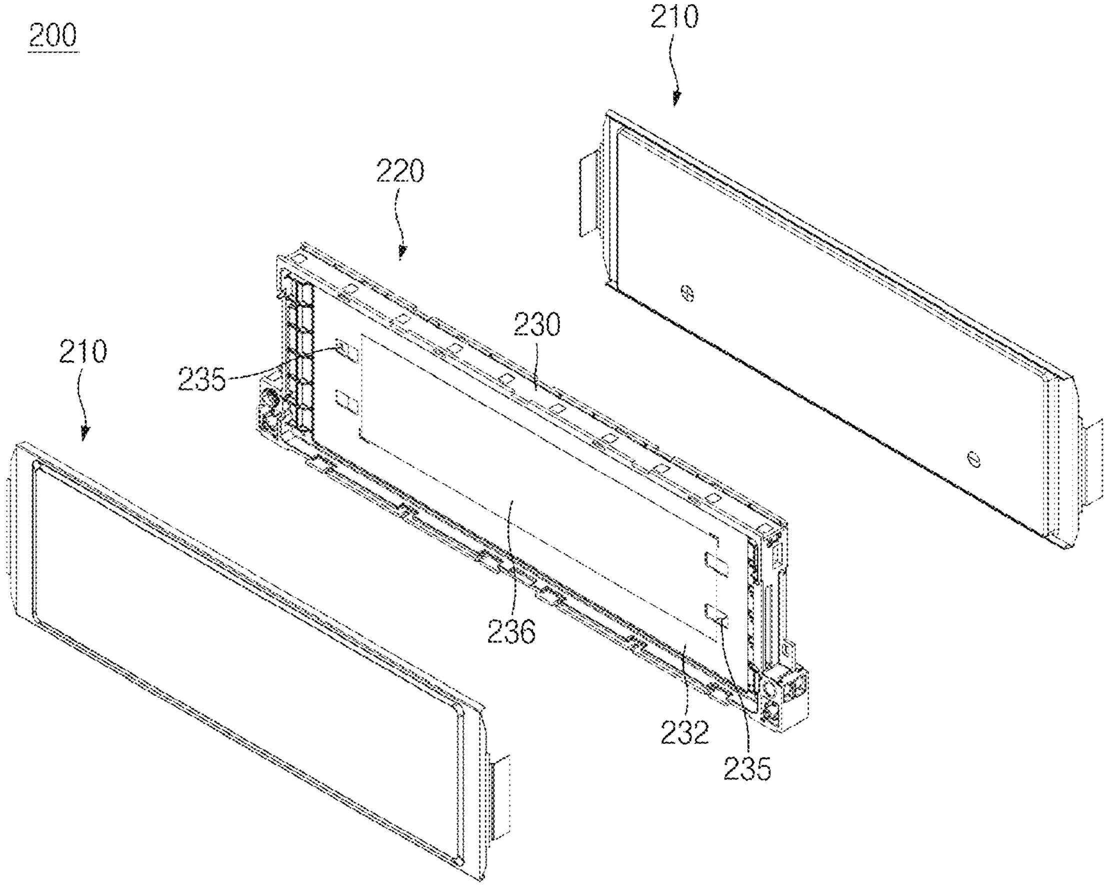
FIG. 20 is an exploded perspective view showing a state in which a unit module of a battery module assembly according to an exemplary embodiment of the present disclosure is disassembled.
Figure 21:
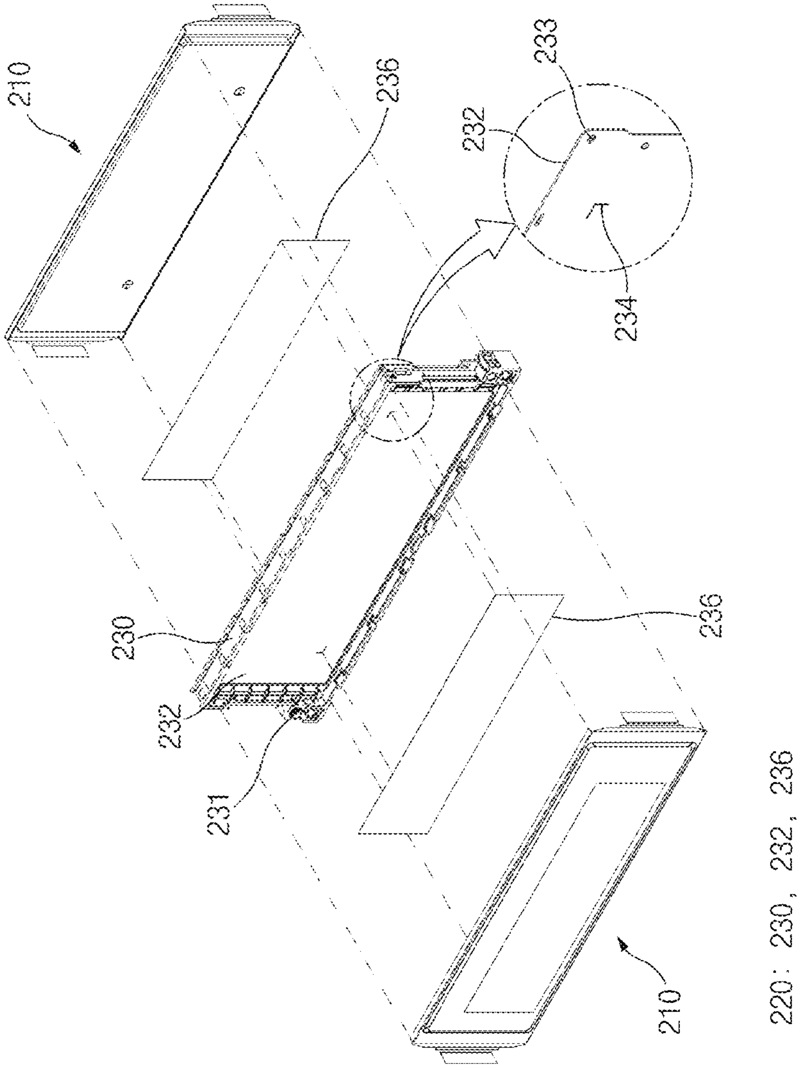
FIG. 21 is an exploded perspective view showing a state in which a unit module of a battery module assembly according to an exemplary embodiment of the present disclosure is disassembled.
Figure 22:
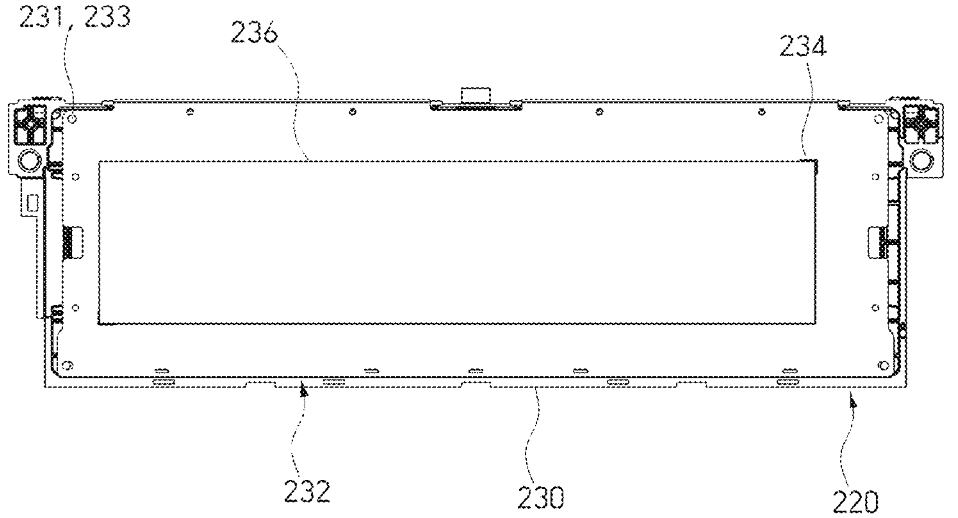
FIG. 22 is a front view showing the front of a cartridge assembly of a battery module assembly according to an exemplary embodiment of the present disclosure.
Figure 23:
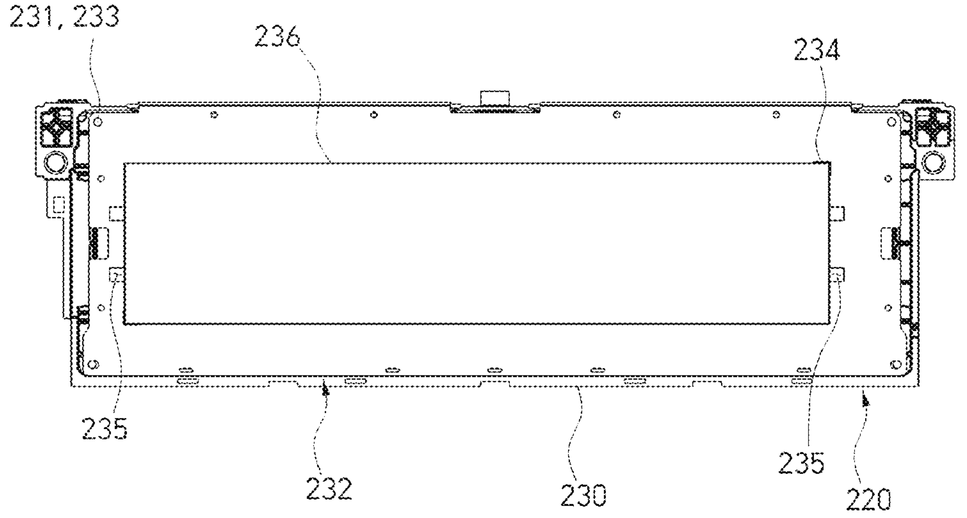
FIG. 23 is a front view showing the front of a cartridge assembly of a battery module assembly according to another exemplary embodiment of the present disclosure.

FIG. 19 is an exploded perspective view showing a state in which a battery module assembly according to an exemplary embodiment of the present disclosure is disassembled, FIG. 20 is an exploded perspective view showing a state in which a unit module of a battery module assembly according to an exemplary embodiment of the present disclosure is disassembled, FIG. 21 is an exploded perspective view showing a state in which a unit module of a battery module assembly according to an exemplary embodiment of the present disclosure is disassembled, FIG. 22 is a front view showing the front of a cartridge assembly of a battery module assembly according to an exemplary embodiment of the present disclosure, and FIG. 23 is a front view showing the front of a cartridge assembly of a battery module assembly according to another exemplary embodiment of the present disclosure.

Referring to FIGS. 19 to 23, a battery module assembly 100 according to an exemplary embodiment of the present disclosure includes a plurality of unit modules 200 stacked in the horizontal direction.

The plurality of stacked unit modules 200 are assembled by a fastening means such as a long bolt.

Each of the unit modules 200 includes a battery cell 210 and a cartridge assembly 220.

The battery cell 210 includes a pair of plate-shape (pouch-type) cells, and the cells stand in direction to face each other.

Also, the battery cell 210 may have electrode terminals formed on both sides.

The pair of battery cells 210 are located on both side surfaces of a single cartridge assembly 220 with the cartridge assembly 220 therebetween.

The cartridge assembly 220 is located between the pair of battery cells 210 to fix the pair of battery cells 210, and cools heat generated from the battery cells 210.

The cartridge assembly 220 includes a cartridge member 230, a cooling fin 232, and an adhesive means 236.

The cartridge member 230 has the number corresponding to that of the battery cells 210, and a pair of battery cells 210 are fixed thereto.

The cartridge member 230 include a pin fixing hole 231.

The pin fixing hole 231 is formed at each of the upper end and the lower end on both side surfaces of the cartridge member 230, and allows the cooling fin 232 to be fixed to the cartridge member 230.

The cooling fin 232 has a rectangular plate shape and cools heat generated from the battery cells 210.

In particular, the pair of battery cells 210 are brought into surface contact with both side surfaces of a single cooling fin 232 and fixed thereto with the cooling fin 232 therebetween.

Also, the heat generated from the pair of battery cells 210 is moved to a cooling device located outside a BMA via the cooling fin 232.

That is, the battery cell 210 is cooled through heat exchange with the cooling device by using the cooling fin 232.

Accordingly, it is preferable that the cooling fin 232 is made of a material having high heat conductivity.

Also, the area of the cooling fin 232 may be greater or smaller than the area of the battery cell 210 depending on a cooling method of the battery cell 210.

Thus, a cartridge fixing hole 233 may be formed in a region that does not overlap the battery cell 210, and this will be described later.

The cooling fin 232 includes a cartridge fixing hole 233 and a guide portion 234.

The cartridge fixing hole 233 is formed at each of the upper end and the lower end on both side surfaces of the cooling fin 232, and the cartridge fixing holes 233 are formed in regions that do not overlap the battery cell 210 fixed to the cartridge member 230.

Also, the cartridge fixing holes 233 allow the cooling fin 232 to be fixed to the cartridge member 230.

To this end, communication with the pin fixing hole 231 of the cartridge member 230 is established.

Therefore, a separate fastening means passes through the cartridge fixing hole 233 and the pin fixing hole 231 and thus may allow the cooling fin 232 to be fixed to the cartridge member 230.

The guide portion 234 protrudes upward from each of both side surfaces of the cooling fin 232, and guides the adhesion position of the adhesive means 236 when the adhesive means 236 is attached to each of both side surfaces of the cooling fin 232.

To this end, the guide portions 234 may be formed in a diagonal direction of the adhesive means 236.

The guide portions 234 may have shapes corresponding to edges of the adhesive means 236 so that the adhesive means 236 can be accurately positioned in the cooling fin 232 when the adhesive means 236 is attached to the cooling fin 232.

Meanwhile, two guide portions 234 are illustrated in the drawing, but two or more guide portions 234 may be formed according to use environment of the adhesive means 236.

The adhesive means 236 is attached to each of both side surfaces of the cooling fin 232, and allows the pair of battery cells 210 to be easily fixed to both side surfaces of the cooling fin 232.

It is preferable that the adhesive means are made of a transparent double-sided tape.

For example, the adhesive means 236 such as the transparent double-sided tapes are attached to both side surfaces of the cooling fin 232.

Also, the pair of battery cells 210 are fixed to both side surfaces of the cooling fin 232 by the adhesive means 236, thereby constituting the unit module 200.

Meanwhile, the thickness of the adhesive means 236 is greater than the thickness of the guide portion 234.

Accordingly, the battery cell 210 adhering to the adhesive means 236 may easily adhere to the adhesive means 236 without a contact with the end of the guide portion 234.

Meanwhile, in a battery module assembly according to another exemplary embodiment of the present disclosure, a removal hole may be included in a cooling fin.

FIG. 23 is a front view showing the front surface of a cooling fin of a battery module assembly according to another exemplary embodiment of the present disclosure.

Referring to FIG. 23, a removal hole 235 is formed in each of both side surfaces of the cooling fin 232 and may be configured to easily separate the adhesive means 236 from the cooling fin 232 during a manufacturing process for the battery module assembly.

Specifically, the removal holes 235 are formed at various positions on the cooling fin 232, for example, both side surfaces or upper and lower regions of the cooling fin 232, and are formed in regions that partially overlap the adhesive means 236 adhering onto the cooling fin 232.

That is, the adhesive means partially covers the removal hole.

Accordingly, when the adhesive means 236 adhering to the cooling fin 232 is removed, the removal hole 235 allows an operator to insert his or her finger into the removal hole 235, thereby easily removing the adhesive means 236 from the cooling fin 232.

Meanwhile, the battery module assembly 100 may further include a cover member 260 that includes side covers 261 connected to both side surfaces, a front cover 262 for covering the front surface of the module, and a rear cover 263 for covering the rear surface.

For unit modules 200 having the above components according to the present disclosure, a process of placing the battery cells 210 on both side surfaces of the cartridge assembly 220 to assemble an individual unit module 200 is performed.

Specifically, the battery cells 210 are attached to both side surfaces of the plate-shaped cooling fin 232 by using the adhesive means 236 with the cartridge assembly 220 having the cooling fin 232 therebetween, and thus the individual unit module 200 is assembled.

Fifth Embodiment

Figure 24:
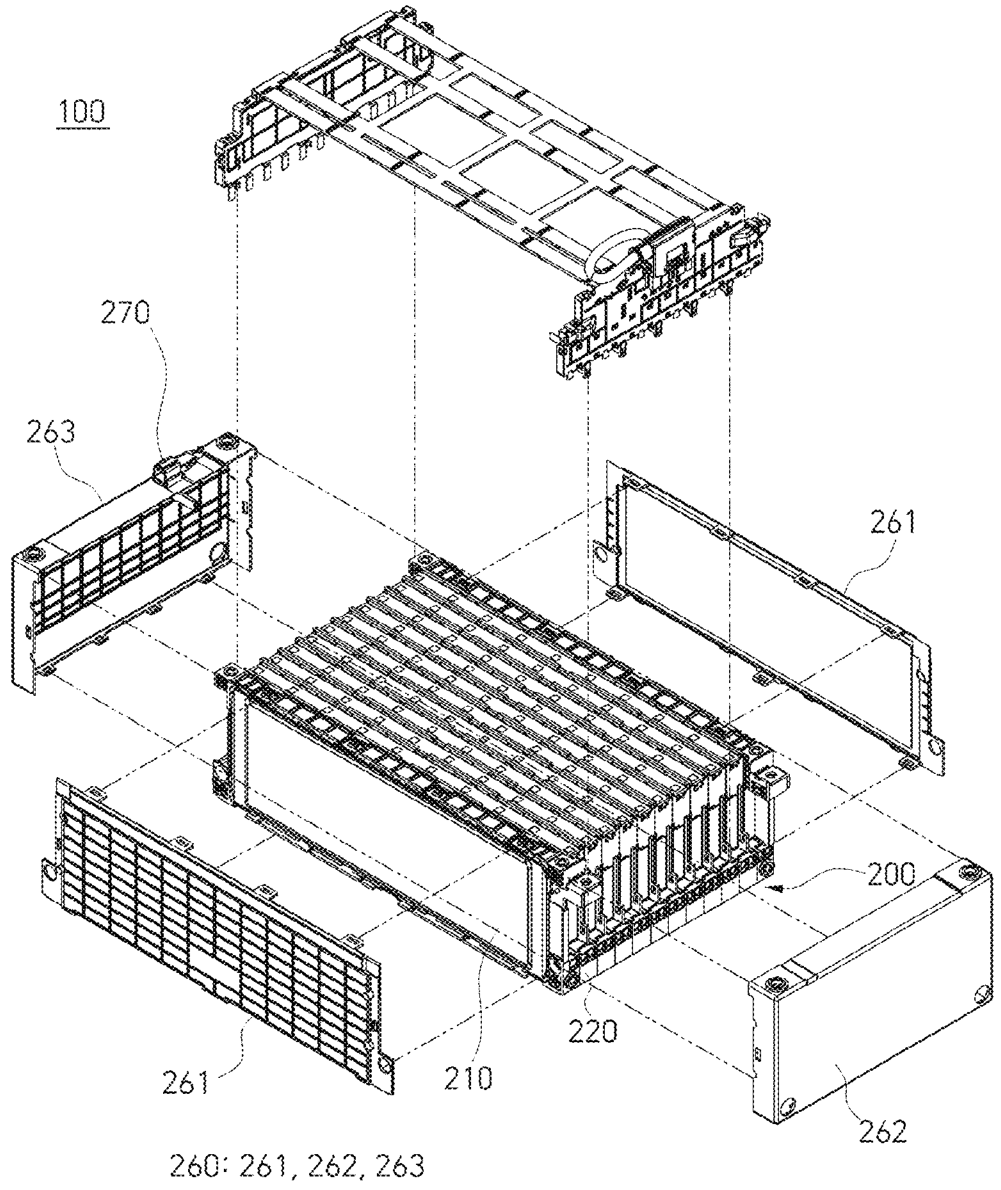
FIG. 24 is an exploded perspective view showing a state in which a battery module assembly according to an exemplary embodiment of the present disclosure is disassembled.
Figure 25:
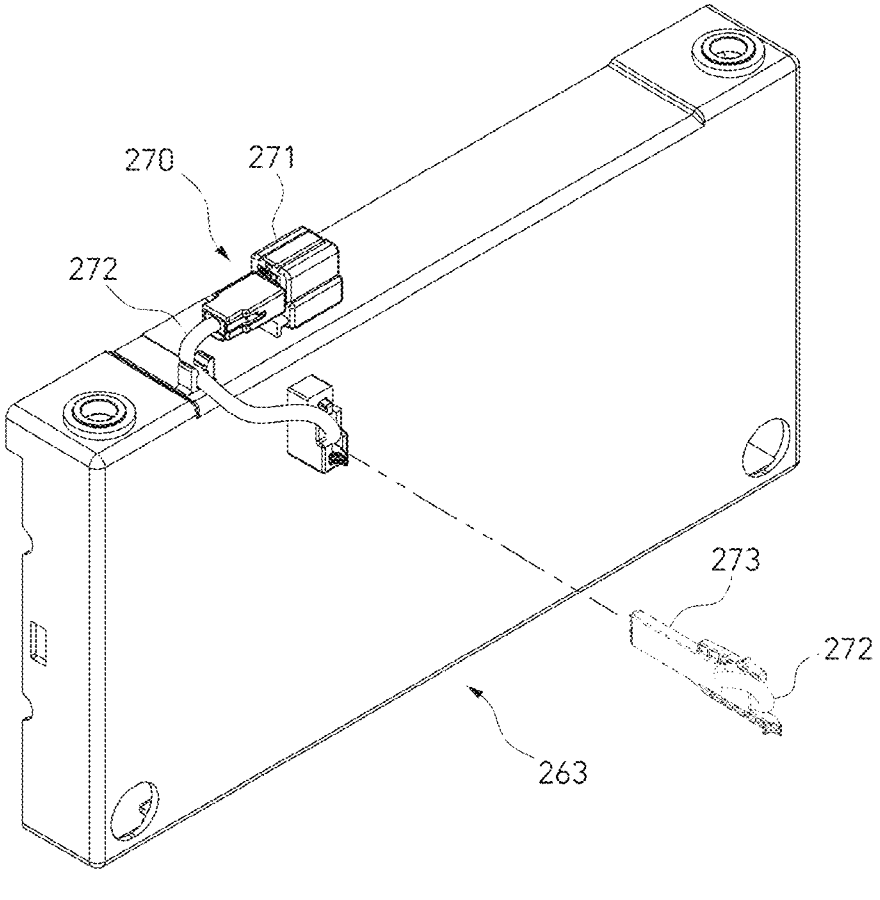
FIG. 25 is a perspective view showing, in one direction, a rear cover and a sensing module of a battery module assembly according to an exemplary embodiment of the present disclosure.
Figure 26:
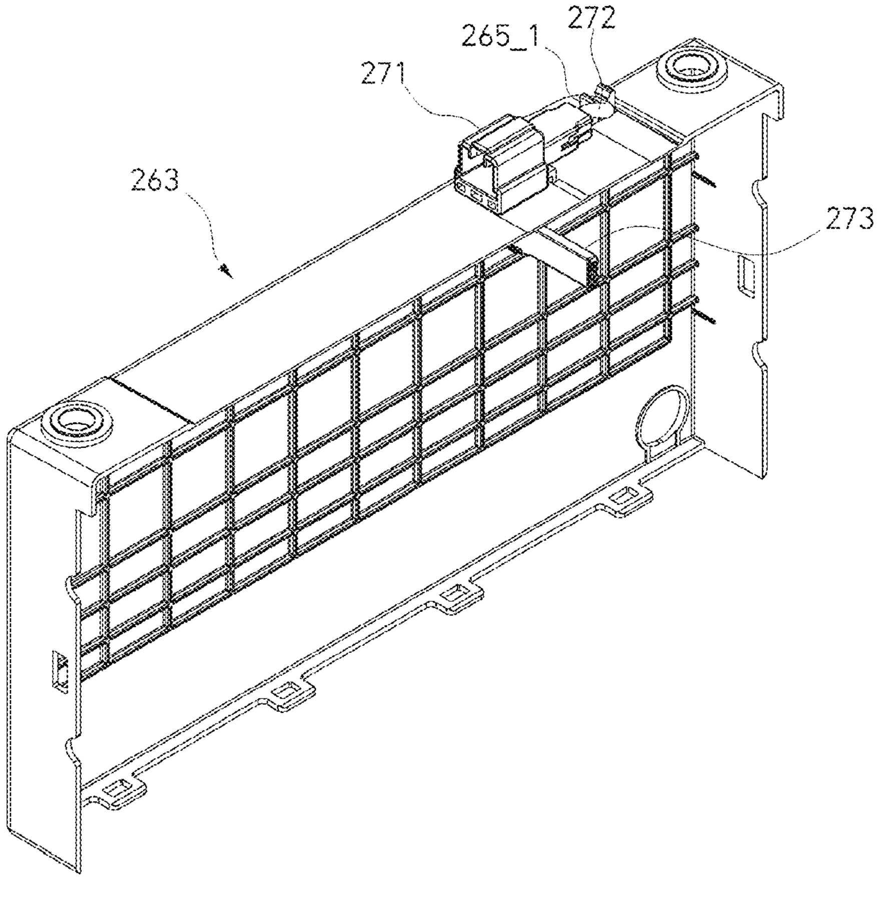
FIG. 26 is a perspective view showing, in the other direction, a rear cover and a sensing module of a battery module assembly according to an exemplary embodiment of the present disclosure.
Figure 27:
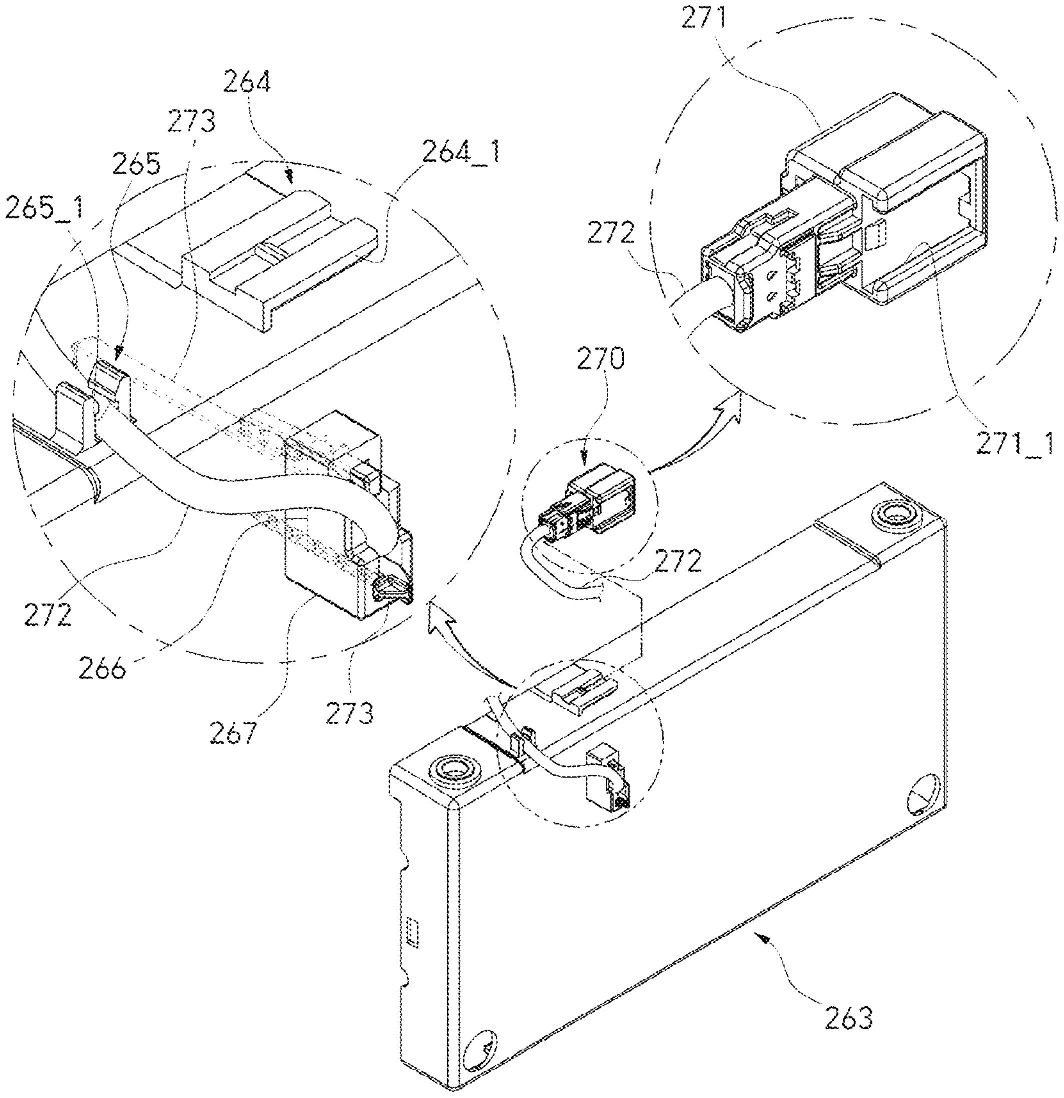
FIG. 27 is an exploded perspective view showing a rear cover and a sensing module of a battery module assembly according to an exemplary embodiment of the present disclosure.

FIG. 24 is an exploded perspective view showing a state in which a battery module assembly according to an exemplary embodiment of the present disclosure is disassembled, FIG. 25 is a perspective view showing, in one direction, a rear cover and a sensing module of a battery module assembly according to an exemplary embodiment of the present disclosure, FIG. 26 is a perspective view showing, in the other direction, a rear cover and a sensing module of a battery module assembly according to an exemplary embodiment of the present disclosure, and FIG. 27 is an exploded perspective view showing a rear cover and a sensing module of a battery module assembly according to an exemplary embodiment of the present disclosure.

Meanwhile, the sensing module may be located at various positions depending on the use environments or specifications, and the sensing module according to an exemplary embodiment of the present disclosure is described, for example, as being coupled to the upper portion of a rear cover.

Referring to FIGS. 24 to 27, a battery module assembly 100 according to an exemplary embodiment of the present disclosure includes a plurality of unit modules 200 stacked in the horizontal direction.

The plurality of stacked unit modules 200 are assembled by a fastening means such as a long bolt.

Each of the unit modules 200 includes a battery cell 210, a cartridge assembly 220, a cover member 260, and a sensing module 270. More specifically, the sensing module 270 may be a temperature sensing module for measuring the temperature.

The battery cell 210 includes a pair of plate-shape (pouch-type) cells, and the cells stand in direction to come into surface contact with each other.

Also, the battery cell 210 may have electrode terminals formed on both sides.

The pair of battery cells 210 are located on both side surfaces of a single cartridge assembly 220 with the cartridge assembly 220 therebetween.

The cartridge assembly 220 has the number corresponding to that of the battery cells 210, and a pair of battery cells 210 are fixed thereto.

The cover member 260 covers the cartridge assembly 220 and the battery cells 210 located on the cartridge assembly 220.

The cover member 260 includes a side cover 261, a front cover 262, and a rear cover 263.

The side cover 261 may be configured to cover the battery cells which are provided on the outermost sides among the plurality of battery cells 210 provided in the battery module assembly 100, thereby protecting the plurality of battery cells 210 and the cartridge assemblies 220 provided in the battery module assembly 100 from the outside. Also, the surface pressure pad 300 described above may be attached to the inner surface of the side cover 261 that faces the battery cell, and the surface pressure pad 300 may press the battery cell provided on the outermost side. Also, two neighboring battery module assemblies 100 may be connected to each other by the side cover 261.

Accordingly, the side cover 261 may effectively secure safety of the battery cell 210.

The front cover 262 covers the front surfaces of the plurality of cartridge assemblies 220 and the battery cells 210 fixed to the cartridge assemblies 220.

The rear cover 263 covers the rear surfaces of the plurality of cartridge assemblies 220 and the battery cells 210 which are to be fixed to the cartridge assemblies 220.

The rear cover 263 includes a connector fixing portion 264, a wire fixing portion 265, a sensor through-hole 266, and a sensor support 267.

The connector fixing portion 264 allows a temperature sensing connector 271 of the sensing module 270 to be fixed thereto, and fixes the temperature sensing connector 271 to the upper portion of the rear cover 263.

Meanwhile, the temperature sensing connector 271 of the sensing module 270 coupled to the connector fixing portion 264 is coupled to the connector fixing portion 264 in a sliding manner.

To this end, the connector fixing portion 264 includes a sliding protrusion 264_1.

The sliding protrusion 264_1 extends from the connector fixing portion 264 in the horizontal direction when viewed in a plan view, and is formed at a position spaced a distance from the upper surface of the rear cover 263 in the vertical direction.

Accordingly, a groove, to which the temperature sensing connector 271 of the sensing module 270 is coupled, may be formed between the sliding protrusion 264_1 and the upper surface of the rear cover 263.

The wire fixing portion 265 is provided as a pair, and extends in the vertical direction when viewed in the plan view and is formed at a position spaced a distance from the connector fixing portion 264 on the upper surface of the rear cover 263.

Also, the wire fixing portion 265 fixes a sensor wire 272 of the sensing module 270.

Thus, the pair of wire fixing portions 265 are spaced apart from each other by a distance enough to fix the sensor wire 272.

That is, the distance between the pair of wire fixing portions 265 is formed to be greater than or equal to the thickness of the sensor wire 272.

The wire fixing portions 265 includes locking members 265_1.

The locking members 265_1 extend from the ends of the pair of wire fixing portions 265 in direction to face each other.

Also, the distance between the pair of locking members 265_1 is formed to be smaller than the thickness of the sensor wire 272 that is inserted between the pair of wire fixing portions 265.

Accordingly, the wire fixing portions 265 may effectively restrain the sensor wire 272 from freely moving above the rear cover 263 and effectively prevent the sensor wire 272 from being effectively curved.

In particular, the locking members 265_1 may effectively prevent the sensor wire 272 fixed to the wire fixing portions 265 from escaping from the wire fixing portions 265.

The sensor through-hole 266 is to fix a temperature sensor 273 of the sensing module 270 to the rear cover 263 and passes through one surface and the other surface of the rear cover 263.

That is, the sensor through-hole 266 allows the sensor wire 272 of the sensing module 270 to pass therethrough into the rear cover 263, and thus the temperature sensor 273 connected to the sensor wire may be brought into surface contact with the battery cell 210 to be measured.

Meanwhile, the sensor through-hole 266 may be formed at various positions depending on specifications of the battery module assembly 100.

The sensor support 267 protrudes from a peripheral region of the sensor through-hole 266, and supports a portion of the temperature sensor 273 which protrudes from the sensor through-hole 266 while being fixed to the sensor through-hole 266.

Thus, the sensor support 267 supports the temperature sensor 273 that protrudes from the sensor through-hole 266 and thus may effectively prevent the temperature sensor 273 from being detached from the rear cover 263.

The sensing module 270 is fixed to the rear cover 263 to sense the temperature inside the unit module 200, and transmits the sensed temperature values to a control board of a battery management system (BMS).

Meanwhile, the sensing module 270 has been described as being fixed to the rear cover 263 but may be fixed at various positions such as the side cover 261 or the front cover 262 depending on use environments or specifications of the battery module 100.

The sensing module 270 includes a temperature sensing connector 271, a sensor wire 272, and a temperature sensor 273.

The temperature sensing connector 271 is coupled to the connector fixing portion 264 formed on the top surface of the rear cover 263.

To this end, the temperature sensing connector 271 includes a sliding groove 271_1.

The sliding groove 271_1 is formed in the lower portion of the temperature sensing connector 271 and coupled to the sliding protrusion 264_1 of the connector fixing portion 264 in a sliding manner.

Thus, the temperature sensing connector 271 is coupled to the connector fixing portion 264 in a sliding manner, and thus the assembly efficiency between the sensing module 270 and the rear cover 263 may be effectively enhanced.

One end of the sensor wire 272 extends from the temperature sensing connector 271, the middle region thereof is fixed to the wire fixing portion 265, and the other end thereof is connected to the temperature sensor 273 which is fixed to the sensor through-hole 266 while being supported by the sensor support 267.

The temperature sensor 273 senses the surface temperature of a specific battery cell 210 inside the unit module 200 and is coupled to the sensor through-hole 266 while being supported by the sensor support 267.

Also, the temperature sensor 273 senses the temperature inside the unit module 200 and, specifically, the temperature of the battery cell 210, and transmits the sensed temperature value to a control board of a battery management system (BMS).

Figure 28:
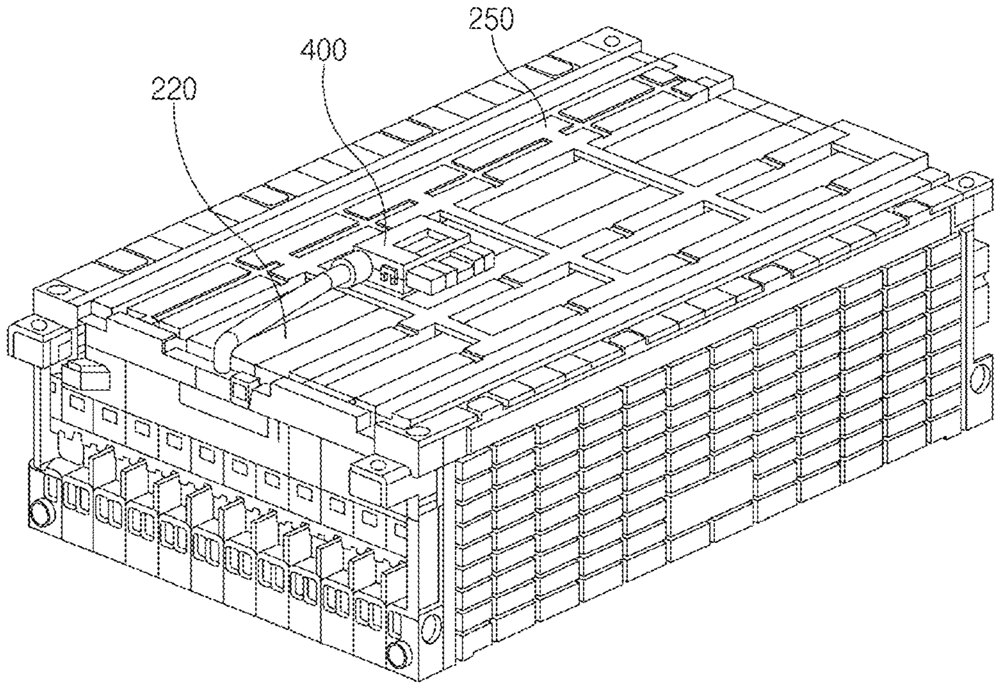
FIG. 28 is a perspective view illustrating a state in which a connector is temporarily fixed to a cartridge assembly during a manufacturing method of a battery module assembly according to the present disclosure.
Figure 29:
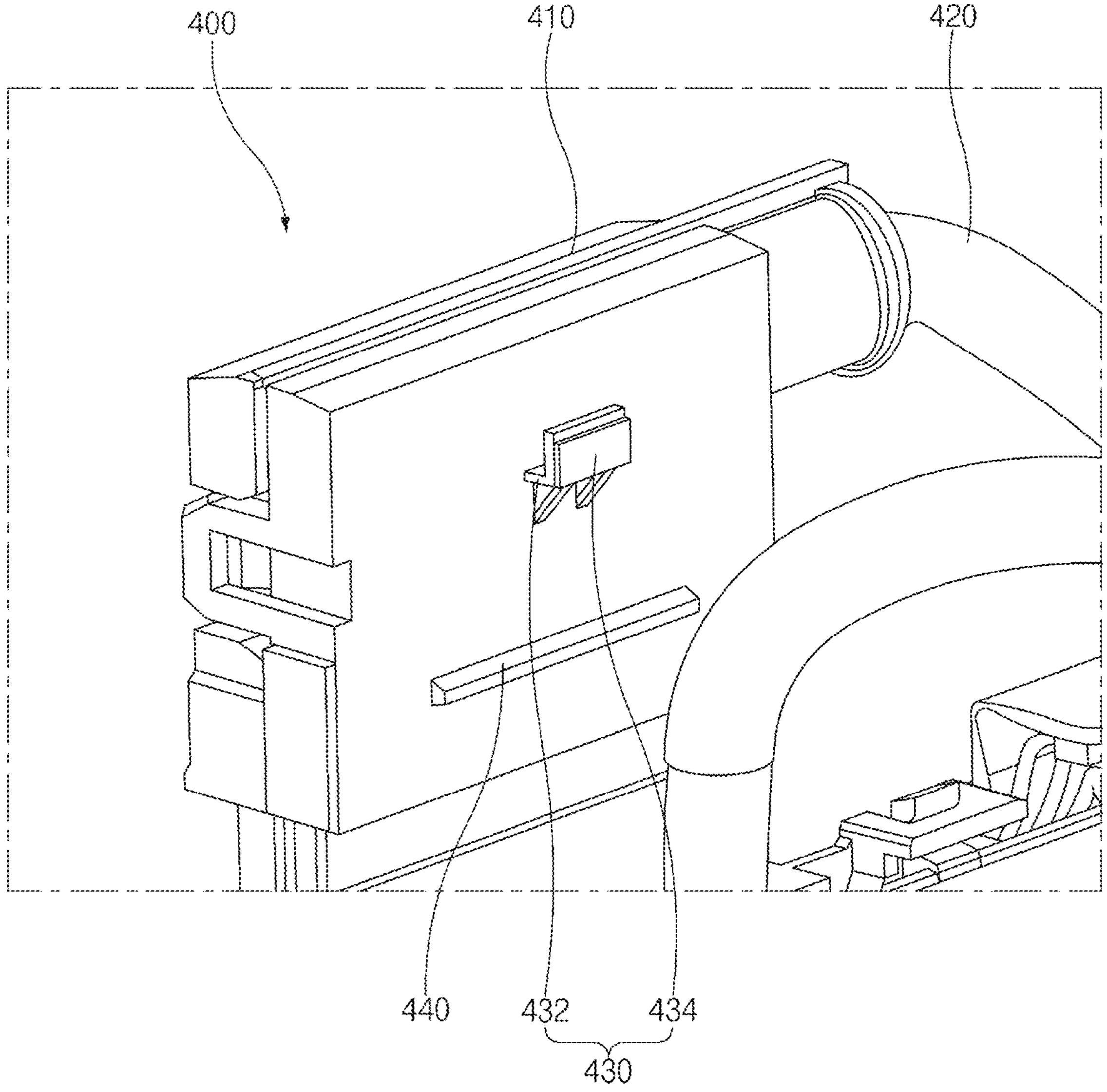
FIG. 29 is an enlarged perspective view illustrating a connector provided in a battery module assembly according to the present disclosure.
Figure 30:
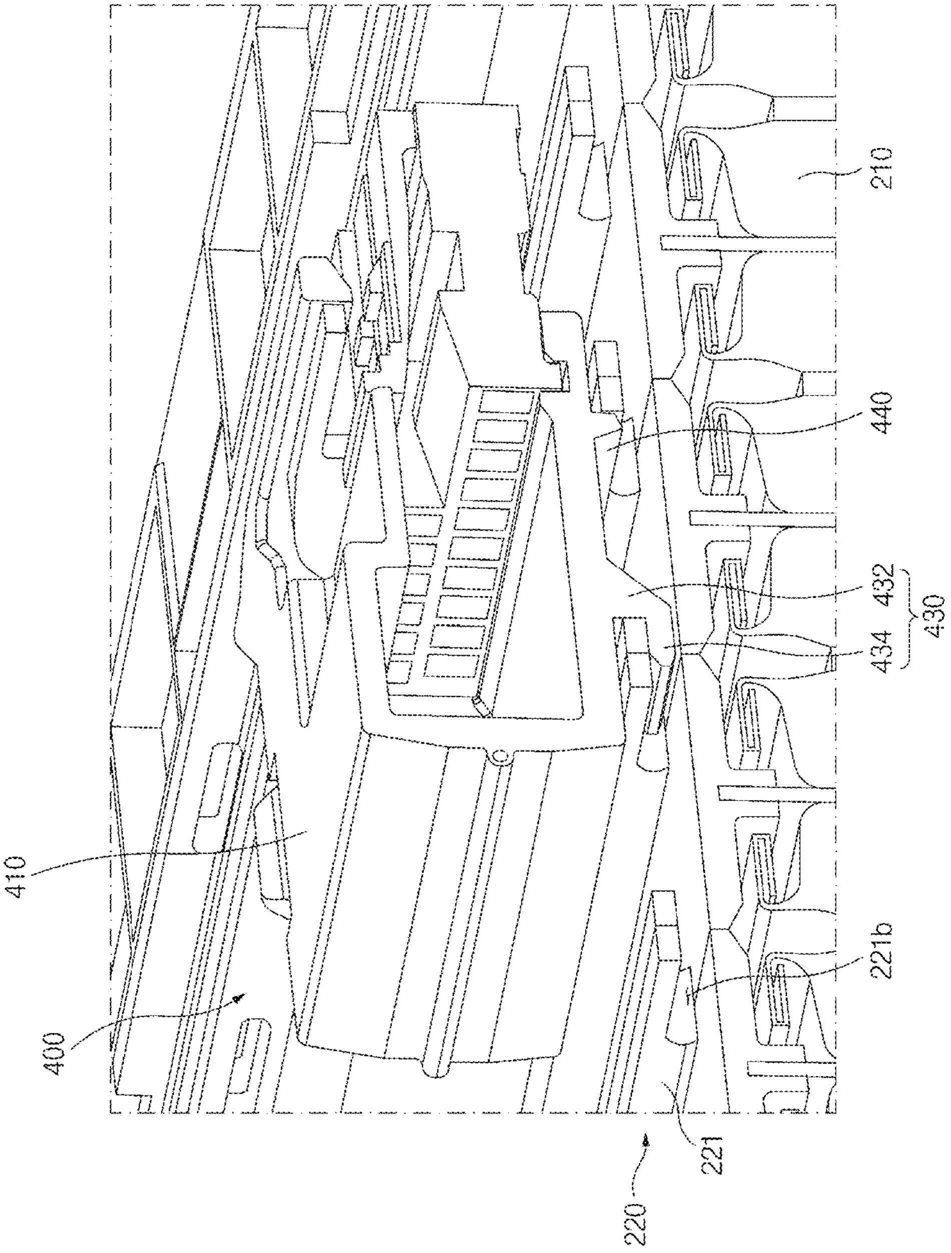
FIG. 30 is a perspective view illustrating a vertical cross-sectional structure in a state in which a connector is temporarily fixed to a cartridge assembly during a manufacturing method of a battery module assembly according to the present disclosure.
Figure 31:
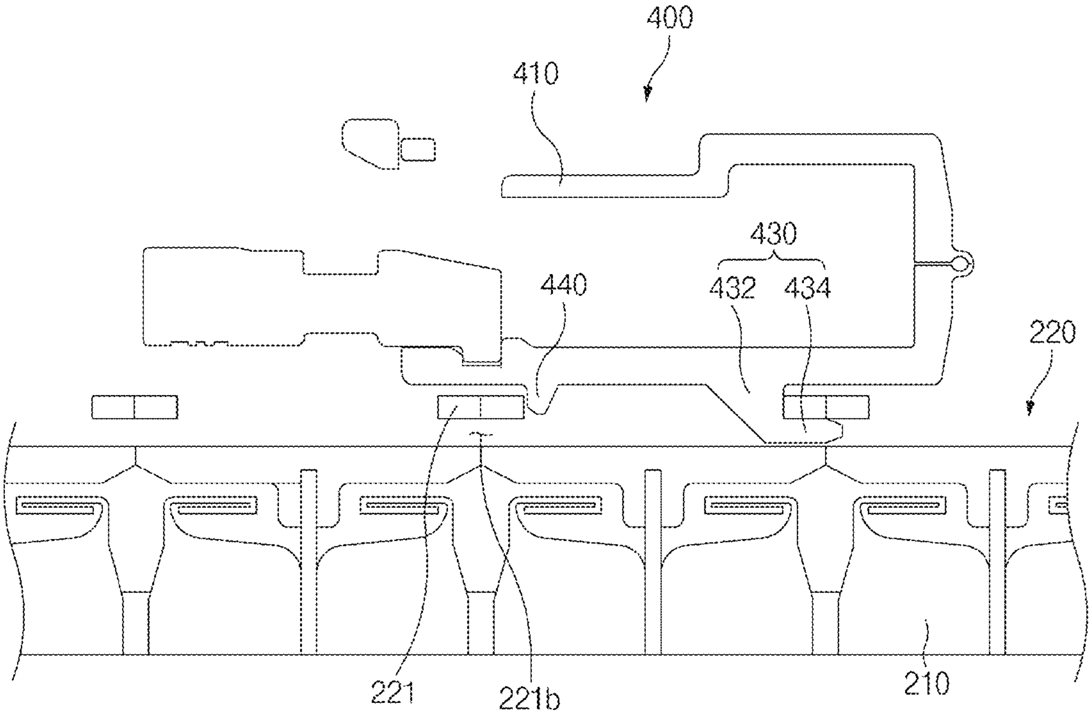
FIG. 31 is a cross-sectional view illustrating a vertical cross-sectional structure in a state in which a connector is temporarily fixed to a cartridge assembly during a manufacturing method of a battery module assembly according to the present disclosure.

FIG. 28 is a perspective view illustrating a state in which a connector is temporarily fixed to a cartridge assembly during a manufacturing method of a battery module assembly according to the present disclosure, and FIG. 29 is an enlarged perspective view illustrating a connector provided in a battery module assembly according to the present disclosure. FIG. 30 is a perspective view illustrating a vertical cross-sectional structure in a state in which a connector is temporarily fixed to a cartridge assembly during a manufacturing method of a battery module assembly according to the present disclosure, and FIG. 31 is a cross-sectional view illustrating a vertical cross-sectional structure in a state in which a connector is temporarily fixed to a cartridge assembly during a manufacturing method of a battery module assembly according to the present disclosure.

According to the present disclosure, a battery module assembly 100 may further include a connector 400 provided in a sensing assembly 250. The connector 400 may be configured to electrically connect a plurality of battery cells 210 provided in the battery module assembly 100 to the outside.

As illustrated in FIG. 29, the connector 400 may include a connector body 410, a wire member 420 extending from the connector body 410, and a first protrusion region 430 protruding from the connector body 410. During a manufacturing process of the battery module assembly 100, the connector 400 may be temporarily fixed to the cartridge assembly 220 by the first protrusion region 430.

More specifically, an upper sensing assembly connection hole 221*b* may be formed in an upper region of the cartridge assembly 220 as described above, and the first protrusion region 430 may have a shape that can be inserted into the upper sensing assembly connection hole 221*b*.

As described above, the upper sensing assembly connection hole 221*b* may be configured to fix the sensing assembly 250 to the cartridge assembly 220. That is, as a cartridge connection protrusion 252 (see FIG. 14D, etc.) is inserted into the upper sensing assembly connection hole 221*b* as described above, the sensing assembly 250 may be fixed to the cartridge assembly 220. Moreover, according to the present disclosure, the upper sensing assembly connection hole 221*b* provides a space into which the first protrusion region 430 of the connector 400 can be inserted, and thus the connector 400 may be temporarily fixed during the manufacturing process of the battery module assembly.

Continuing to refer to FIG. 29, the first protrusion region 430 may include an extension section 432, which extends from the connector body 410 and protrudes outward in one direction, and a bent section 434, which has a shape bent from the extension section 432. Here, the bent section 434 may have a shape insertable into the upper sensing assembly connection hole 221*b*. Thus, according to the present disclosure, as the bent section 434 is inserted into the upper sensing assembly connection hole 221*b* during the manufacturing process of the battery module assembly 100, the connector 400 may be temporarily fixed to the cartridge assembly 220.

Meanwhile, the connector 400 may further include a second protrusion region 440 that is provided separately from the first protrusion region 430 and protrudes from the connector body 410. As illustrated in FIG. 29, the second protrusion region 440 may have a different shape from the first protrusion region 430. However, the first protrusion region 430 and the second protrusion region 440 may protrude from one side surface among the plurality of side surfaces provided in the connector body 410.

In one example, the direction, in which the extension section 432 extends from the connector body 410, may be parallel to the direction, in which the second protrusion region 440 extends from the connector body 410. However, the length, by which the extension section 432 extends from the connector body 410, is greater than the length, by which the second protrusion region 440 extends from the connector body 410. Thus, as illustrated in FIGS. 30 and 31, when the connector 400 is temporarily fixed to the cartridge assembly 220, the second protrusion region 440 may be on only one side surface of the cartridge assembly 220 in the left-right direction while the bent section 434 of the first protrusion region 430 is inserted into the upper sensing assembly connection hole 221*b*. In this case, the first protrusion region 430 may prevent the connector 400 from moving from the cartridge assembly 220 in the up-down direction and the left-right direction, thereby temporarily fixing the connector 400. The second protrusion region 440 may prevent the connector 400 from moving from the cartridge assembly 220 in the left-right direction, thereby temporarily fixing the connector 400 more effectively.

More specifically, referring to FIGS. 30 and 31, the cartridge assembly 220 may include a partition wall region 221 that has a shape protruding upward and extending such that a front-rear direction is a longitudinal direction, and the upper sensing assembly connection hole 221*b* may be formed in the partition wall region 221. More preferably, a distance between the first protrusion region 430 and the second protrusion region 440 may correspond to a distance between two partition wall regions 221 provided in two neighboring cartridge assemblies 220. Thus, when the connector 400 is temporarily fixed to the cartridge assembly 220, the connector 400 is inserted into a space between two neighboring partition wall regions 221. Here, the bent section 434 of the first protrusion region 430 may be inserted into one of the two partition wall regions 221, and the second protrusion region 440 may be provided in close contact with the side surface of the other of the two partition wall regions 221.

Continuing to refer to FIGS. 29 and 30, when the connector 400 is assembled to the cartridge assembly 220 such that the bent section 434 is inserted into the upper sensing assembly connection hole 221*b* while the second protrusion region 440 faces the partition wall region 221, a width of the second protrusion region 440 extending in the longitudinal direction of the partition wall region 221 may be greater than a width of the first protrusion region 430 extending in the longitudinal direction of the partition wall region 221. Thus, according to the present disclosure, when the connector 400 is temporarily fixed to the cartridge assembly 220, the second protrusion region 430 may effectively prevent the connector 400 from moving in the left-right direction.

Meanwhile, as described above, the sensing assembly 250 may include a plurality of cartridge connection protrusions 252 (see FIG. 14D, etc.) provided inside an upper end thereof. Here, the plurality of cartridge connection protrusions 252 may be inserted into only a portion of the plurality of upper sensing assembly connection holes 221*b* formed in the plurality of cartridge assemblies 220. Thus, during a manufacturing process of a battery module assembly which will be described later, the connector 400 may be temporarily fixed by being inserted into another portion of the plurality of upper sensing assembly connection holes 221*b* formed in the plurality of cartridge assemblies 220.

A method for manufacturing a battery module assembly according to the present disclosure will be described below with reference to the above descriptions.

A method for manufacturing a battery module assembly 100 according to the present disclosure may include a unit module preparation operation of preparing a unit module 200 that includes a plurality of battery cells 210 and a plurality of cartridge assemblies 220 for fixing the plurality of battery cells 210, a sensing assembly mounting operation of mounting a sensing assembly 250 to upper ends of the plurality of cartridge assemblies 220, a first connector fixing operation of temporarily fixing, to one side of the plurality of cartridge assemblies 220, a connector 400 which is provided in the sensing assembly 250, a welding operation of welding the unit module 200 and the sensing assembly 250 to each other, a front cover placement operation of placing a front cover 262 to the front of the unit module 200, and a second connector fixing operation of fixing the connector 400 to the front cover 262. During the first connector fixing operation, the connector 400 may be temporarily fixed to the cartridge assembly 220.

More specifically, the connector 400 may include a connector body 410 and a first protrusion region 430 protruding from the connector body 410, and an upper sensing assembly connection hole **221*b* may be formed in an upper region of each of the cartridge assemblies 220**.

Here, according to the present disclosure, during the first connector fixing operation, the first protrusion region 430 may be inserted into the upper sensing assembly connection hole **221*b*. More specifically, the first protrusion region 430 may include an extension section 432, which extends from the connector body 410 and protrudes outward, and a bent section 434, which has a shape bent from the extension section 432. During the first connector fixing operation, the bent section 343 may be inserted into the upper sensing assembly connection hole 221*b***.

Also, the connector 400 may include a second protrusion region 440 that is provided separately from the first protrusion region 430 and protrudes from the connector body 410. During the first connector fixing operation, the second protrusion region 440 may come into close contact with the cartridge assembly 220.

More specifically, the cartridge assembly 220 may include a partition wall region 221 which has the upper sensing assembly connection hole **221*b* formed therein and has a shape protruding upward and extending such that a front-rear direction is a longitudinal direction. During the first connector fixing operation, the second protrusion region 440 may come into close contact with a side surface of the partition wall region 221. Accordingly, in a state in which the connector 400 is temporarily fixed to the cartridge assembly 220, that is, during the first connector fixing operation, the partition wall region 221 and the second protrusion region 440 interfere with each other in the left-right direction, and thus it is possible to effectively prevent the connector 400 from moving from the cartridge assembly 220** in the left-right direction.

Meanwhile, the sensing assembly 250 may include a plurality of cartridge connection protrusions 252 provided inside an upper end thereof. Here, during the sensing assembly mounting operation, the plurality of cartridge connection protrusions 252 may be inserted into only a portion of the plurality of upper sensing assembly connection holes **221*b* formed in the plurality of cartridge assemblies 220. During the first connector fixing operation, the bent section 434 may be inserted into another portion of the plurality of upper sensing assembly connection holes 221*b* formed in the plurality of cartridge assemblies 220**.

Meanwhile, during the welding operation described above, cell tabs and bus bars provided in the unit module 200 may be welded to bus bars provided in the sensing assembly 250. Thus, according to the present disclosure, the welding operation may be performed in a state in which the connector 400 is temporarily fixed to the cartridge assembly 220 in the first connector fixing operation, and thus it is possible to prevent the connector 400 from blocking the view of a welding worker during the welding operation.

Meanwhile, the method for manufacturing a battery module assembly according to the present disclosure may further include an upper cover placement operation of placing an upper cover 268 above the sensing assembly 250 and a connector separating operation of separating the connector 400 from the cartridge assembly 220. Here, the connector separating operation is performed between the first connector fixing operation and the second connector fixing operation. The connector separating operation may be to prevent the occurrence of interference between the connector 400 and the upper cover 268 during the upper cover placement operation. Thus, the connector separating operation may be performed prior to the upper cover placement operation.

Also, in the method for manufacturing a battery module assembly according to the present disclosure, the front cover placement operation may be performed after the upper cover placement operation. In addition, the method for manufacturing a battery module assembly may further include a front cover fastening operation of fastening the front cover 262 to the upper surface 268, and the front cover fastening operation is performed after the front cover placement operation. Here, the second connector fixing operation may be performed after the cover fastening operation described above.

According to the present disclosure, the thickness of the cartridge assembly is greater than the thickness of the battery cell, and thus there is no need to add a partition, thereby reducing costs, weight and volume.

In addition, the cell tabs of the front region of the cartridge assembly are bent in the same direction to secure the insulating distance, and thus the insulating material is not required.

Although the present disclosure has been described with reference to preferred embodiments, one skilled in the art will understand that various changes and modifications may be made without departing from the spirit and scope of the present disclosure as hereinafter claimed.

What is claimed is:

1. A battery module assembly in which unit modules are stacked, comprising:
- each of the unit modules including:
  - a plurality of battery cells having electrode terminals and standing in a direction to come into surface contact with each other; and
  - a plurality of cartridge assemblies configured to respectively fix the plurality of battery cells;
- a sensing assembly mounted to upper ends of the plurality of cartridge assemblies and assembled thereto;
- a front cover configured to cover front surfaces of the plurality of cartridge assemblies; and
- a connector fixedly coupled to the sensing assembly,
- wherein the connector comprises:
  - a connector body; and
  - a first protrusion region that protrudes from the connector body,
- wherein an upper sensing assembly connection hole is formed in an upper region of each of the cartridge assemblies, and
- wherein the first protrusion region has a shape insertable into the upper sensing assembly connection hole.

2. The battery module assembly of claim 1, wherein the first protrusion region comprises:
- an extension section that extends from the connector body and protrudes outward; and
- a bent section that has a shape bent from the extension section, and
- wherein the bent section has a shape insertable into the upper sensing assembly connection hole.

3. The battery module assembly of claim 2, wherein the connector comprises a second protrusion region that is provided separately from the first protrusion region and protrudes from the connector body, and
- a direction, in which the extension section extends from the connector body, is parallel to a direction, in which the second protrusion region extends from the connector body.

4. The battery module assembly of claim 3, wherein a length, by which the extension section extends from the connector body, is greater than a length, by which the second protrusion region extends from the connector body.

5. The battery module assembly of claim 3, wherein the each of the cartridge assemblies comprises a partition wall region that has a shape protruding upward and extending in a front-rear direction as a longitudinal direction, and the upper sensing assembly connection hole is formed in the partition wall region.

6. The battery module assembly of claim 5, wherein a distance between the first protrusion region and the second protrusion region corresponds to a distance between two partition wall regions provided in two neighboring cartridge assemblies.

7. The battery module assembly of claim 5, wherein when the connector is assembled to the plurality of cartridge assemblies such that the bent section is inserted into the upper sensing assembly connection hole of a first cartridge assembly of two neighboring cartridge assemblies while the second protrusion region faces a partition wall region of a second cartridge assembly of the two neighboring cartridge assemblies, a width of the second protrusion region extending in the longitudinal direction of the partition wall region of the each of the cartridge assemblies is greater than a width of the first protrusion region extending in the longitudinal direction of the partition wall region of the each of the cartridge assemblies.

8. The battery module assembly of claim 3, wherein the sensing assembly comprises a plurality of cartridge connection protrusions provided inside an upper end thereof, and the plurality of cartridge connection protrusions are inserted into a portion of the plurality of upper sensing assembly connection holes formed in the plurality of cartridge assemblies.

9. A method for manufacturing a battery module assembly, the method comprising:

unit module preparation operation of preparing a unit module that comprises a plurality of battery cells and a plurality of cartridge assemblies for fixing the plurality of battery cells;

sensing assembly mounting operation of mounting a sensing assembly to upper ends of the plurality of cartridge assemblies;

first connector fixing operation of temporarily fixing, to one side of the plurality of cartridge assemblies, a connector which is provided in the sensing assembly;

welding operation of welding the unit module and the sensing assembly to each other;

front cover placement operation of placing a front cover to the front of the unit module; and second connector fixing operation of fixing the connector to the front cover, wherein the connector comprises a connector body and a first protrusion region protruding from the connector body, wherein an upper sensing assembly connection hole is formed in an upper region of each of the plurality of cartridge assemblies, and wherein during the first connector fixing operation, the first protrusion region is inserted into the upper sensing assembly connection hole of a first cartridge assembly of two neighboring cartridge assemblies.

10. The method of claim 9, wherein the first protrusion region comprises an extension section, which extends from the connector body and protrudes outward, and a bent section, which has a shape bent from the extension section, and wherein during the first connector fixing operation, the bent section is inserted into the upper sensing assembly connection hole of the first cartridge assembly.

11. The method of claim 10, wherein the connector comprises a second protrusion region that is provided separately from the first protrusion region and protrudes from the connector body, and wherein during the first connector fixing operation, the second protrusion region comes into close contact with a second cartridge assembly of the two neighboring cartridge assemblies.

12. The method of claim 11, wherein the each of the cartridge assemblies comprises a partition wall region which has the upper sensing assembly connection hole formed therein and has a shape protruding upward and extending in a front-rear direction as a longitudinal direction, and wherein during the first connector fixing operation, the second protrusion region comes into close contact with a side surface of the partition wall region of the second cartridge assembly.

13. The method of claim 11, wherein the sensing assembly comprises a plurality of cartridge connection protrusions provided inside an upper end thereof, wherein during the sensing assembly mounting operation, the plurality of cartridge connection protrusions are inserted into only a portion of the plurality of upper sensing assembly connection holes formed in the plurality of cartridge assemblies, and wherein during the first connector fixing operation, the bent section is inserted into another portion of the plurality of upper sensing assembly connection holes formed in the plurality of cartridge assemblies.

14. The method of claim 9, further comprising prior to the front cover placement operation, connector separating operation of separating the connector from the one side of the plurality of cartridge assemblies.

15. The method of claim 14, further comprising after the connector separating operation and prior to the front cover placement operation, upper cover placement operation of placing an upper cover above the sensing assembly.

16. The method of claim 15, further comprising after the front cover placement operation and prior to the second connector fixing operation, front cover fastening operation of fastening the front cover to the upper cover.

* * * * *